(12) United States Patent
Haynes et al.

(10) Patent No.: US 11,966,224 B2
(45) Date of Patent: *Apr. 23, 2024

(54) SYSTEMS AND METHODS FOR DETECTING SURPRISE MOVEMENTS OF AN ACTOR WITH RESPECT TO AN AUTONOMOUS VEHICLE

(71) Applicant: UATC, LLC, Mountain View, CA (US)

(72) Inventors: Galen Clark Haynes, Pittsburgh, PA (US); Charles R. Hogg, III, Bellevue, PA (US); Skanda Shirdhar, Pittsburgh, PA (US); Neil Traft, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,806

(22) Filed: Oct. 10, 2022

(65) Prior Publication Data
US 2023/0043007 A1 Feb. 9, 2023

Related U.S. Application Data

(63) Continuation of application No. 16/811,531, filed on Mar. 6, 2020, now Pat. No. 11,467,580.

(60) Provisional application No. 62/976,600, filed on Feb. 14, 2020.

(51) Int. Cl.
*G05D 1/00* (2006.01)
*B60W 60/00* (2020.01)

(52) U.S. Cl.
CPC ....... *G05D 1/0088* (2013.01); *B60W 60/0027* (2020.02); *G05D 1/0214* (2013.01); *G05D 1/0221* (2013.01); *B60W 2554/4044* (2020.02); *G05D 2201/0213* (2013.01)

(58) Field of Classification Search
None
See application file for complete search history.

(56) References Cited

U.S. PATENT DOCUMENTS

| | | |
|---|---|---|
| 10,496,091 B1 | 12/2019 | Ross et al. |
| 11,195,418 B1 | 12/2021 | Hong et al. |
| 2005/0007450 A1 | 1/2005 | Hill et al. |
| 2017/0072850 A1 | 3/2017 | Curtis et al. |
| 2017/0327112 A1 | 11/2017 | Yokoyama et al. |
| 2018/0265076 A1 | 9/2018 | Hall et al. |

(Continued)

*Primary Examiner* — Tamara L Weber
(74) *Attorney, Agent, or Firm* — Dority & Manning, P.A.

(57) ABSTRACT

Systems and methods for detecting a surprise or unexpected movement of an actor with respect to an autonomous vehicle are provided. An example computer-implemented method can include, for a first compute cycle, obtaining motion forecast data based on first sensor data collected with respect to an actor relative to an autonomous vehicle; and determining, based on the motion forecast data, failsafe region data representing an unexpected path or area where a likelihood of the actor following the unexpected path or entering the unexpected area is below a threshold. For a second compute cycle after the first compute cycle, the method can include obtaining second sensor data; determining, based on the second sensor data and the failsafe region data, that the actor has followed the unexpected path or entered the unexpected area; and in response to such determination, determining a deviation for controlling a movement of the autonomous vehicle.

20 Claims, 10 Drawing Sheets

(56) References Cited

U.S. PATENT DOCUMENTS

| | | |
|---|---|---|
| 2019/0101924 A1 | 4/2019 | Styler et al. |
| 2019/0122037 A1 | 4/2019 | Russell et al. |
| 2021/0094558 A1 | 4/2021 | Garcia et al. |
| 2021/0095970 A1 | 4/2021 | Lu et al. |
| 2021/0096575 A1 | 4/2021 | Xie et al. |

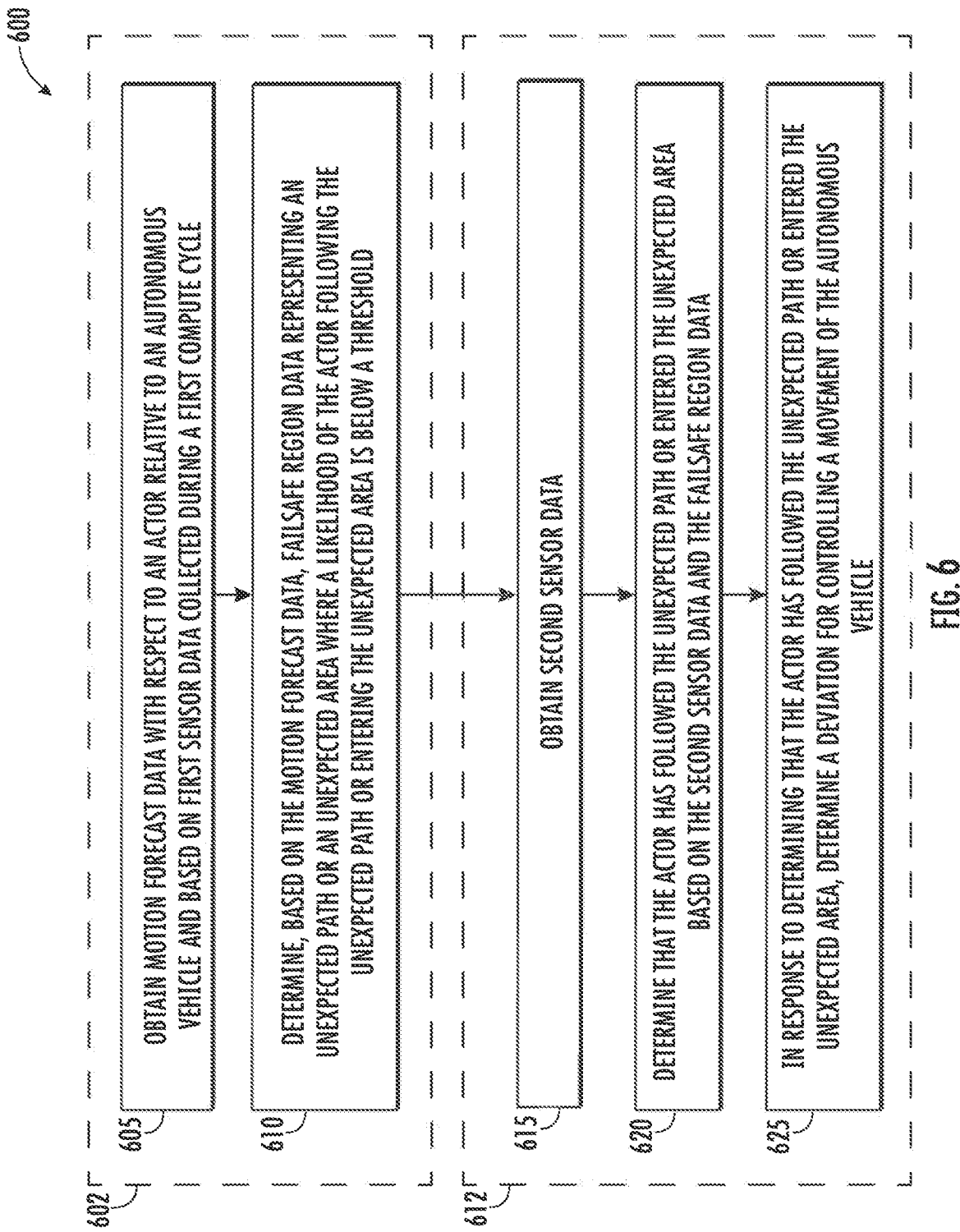

SYSTEMS AND METHODS FOR DETECTING SURPRISE MOVEMENTS OF AN ACTOR WITH RESPECT TO AN AUTONOMOUS VEHICLE

PRIORITY CLAIM

The present application is a continuation of U.S. application Ser. No. 16/811,531, filed Mar. 6, 2020. U.S. application Ser. No. 16/811,531 is hereby incorporated by reference herein in its entirety. U.S. application Ser. No. 16/811,531 claims priority to and the benefit of U.S. Provisional Patent Application Ser. No. 62/976,600 filed Feb. 14, 2020. U.S. Provisional Patent Application Ser. No. 62/976,600 is hereby incorporated by reference herein in its entirety.

FIELD

The present disclosure relates generally to devices, systems, and methods for autonomous vehicle control.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

Aspects of the present disclosure are directed to a computer-implemented method for detecting an actor surprise movement. The method can include, for a first compute cycle of a plurality of compute cycles: obtaining, by a computing system including one or more computing devices, motion forecast data with respect to an actor relative to an autonomous vehicle, the motion forecast data based on first sensor data collected during the first compute cycle; and determining, by the computing system and based on the motion forecast data, failsafe region data representing an unexpected path or an unexpected area where a likelihood of the actor following the unexpected path or entering the unexpected area is below a threshold. The method can include, for a second compute cycle of the plurality of compute cycles that is later than the first compute cycle: obtaining, by the computing system, second sensor data; determining, by the computing system and based on the second sensor data and the failsafe region data, that the actor has followed the unexpected path or entered the unexpected area; and in response to determining that the actor has followed the unexpected path or entered the unexpected area, determining, by the computing system, a deviation for controlling a movement of the autonomous vehicle.

Another aspect of the present disclosure is directed to a computing system including at least one processor, a memory that stores a set of instructions, and one or more processors which use the set of instructions to perform operations. The operations can include, for a first compute cycle of a plurality of compute cycles: obtaining motion forecast data with respect to an actor relative to an autonomous vehicle, the motion forecast data based on first sensor data collected during the first compute cycle; and determining, based on the motion forecast data, failsafe region data representing an unexpected path or an unexpected area where a likelihood of the actor following the unexpected path or entering the unexpected area is below a threshold. The operations can include, for a second compute cycle of the plurality of compute cycles that is later than the first compute cycle: obtaining second sensor data; determining, based on the second sensor data and the failsafe region data, that the actor has followed the unexpected path or entered the unexpected area; and in response to determining that the actor has followed the unexpected path or entered the unexpected area, determining a deviation for controlling a movement of the autonomous vehicle.

Another aspect of the present disclosure is directed to a computer-implemented method for detecting an actor surprise movement. The method can include for a first compute cycle of a plurality of compute cycles: obtaining, by a computing system comprising one or more computing devices, first sensor data; determining, by the computing system and based on the first sensor data, failsafe region data representing an unexpected path or an unexpected area where a likelihood of the actor following the unexpected path or entering the unexpected area is below a threshold; and in response to determining the failsafe region data representing the unexpected path or the unexpected area, determining, by the computing system, a preliminary deviation for controlling the movement of the autonomous vehicle. The method can include for a second compute cycle of the plurality of compute cycles that is later than the first compute cycle: obtaining, by the computing system, second sensor data; determining, by the computing system and based on the second sensor data and the failsafe region data, that the actor has followed the unexpected path or entered the unexpected area; and in response to determining that the actor has followed the unexpected path or entered the unexpected area, determining, by the computing system, a deviation for controlling a movement of the autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts an example flow diagram of an example method for detecting an actor surprise movement with respect to an autonomous vehicle according to example implementations of the present disclosure;

DETAILED DESCRIPTION

Figure 1:
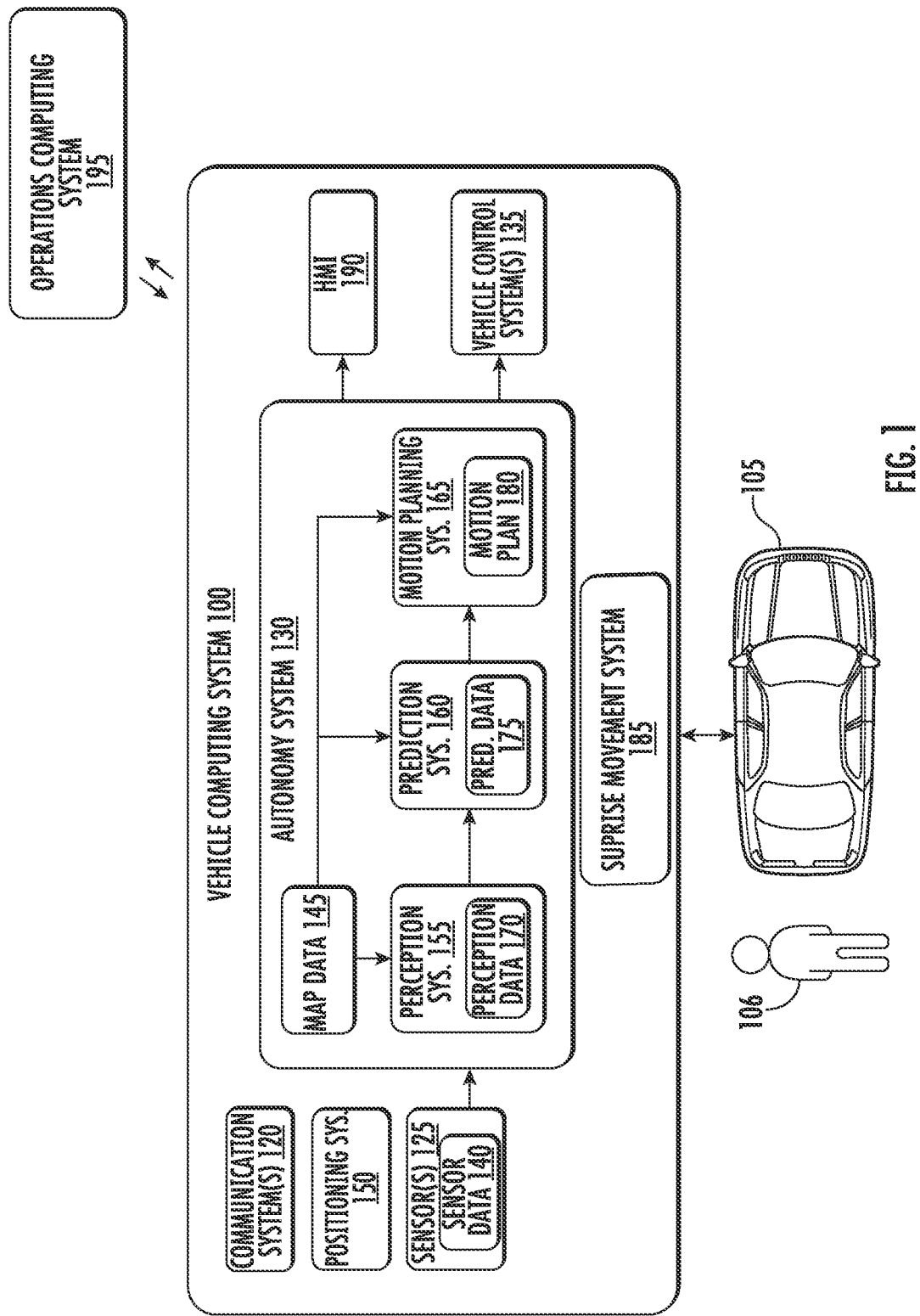
FIG. 1 depicts an example system for detecting an actor surprise movement according to example implementations of the present disclosure.

Generally, the present disclosure is directed to systems and methods for detecting a surprise or unexpected movement of an actor with respect to an autonomous vehicle. Aspects of the present disclosure are directed to improving the autonomous vehicle's ability to anticipate and react to such unexpected movements. Examples of unexpected behaviors can include actors (e.g., pedestrians, other vehicles, etc.) entering unexpected areas and following unexpected paths. As examples, another vehicle can pull out in front of the autonomous vehicle; a bicycle can swerve from a bicycle lane into a path of the autonomous vehicle; or a pedestrian can step out into a cross walk even though he does not have the right of way. These behaviors, while statistically unlikely, are nevertheless foreseeable. The autonomous computing system can predict paths for nearby actors and determine when the actor is deviating from the predicted paths. Such deviations can indicate that the autonomous computing system is not reliably predicting how the actor will act. In such instances, if the actor traverses an unexpected path that could lead to a dangerous condition (e.g., that a path that intersects a path of the autonomous vehicle), then the autonomous computing system can predict the actor's trajectory with a different and/or more simple approach (e.g., a simple ballistic trajectory) and take corrective action based on this trajectory. Further, the autonomous vehicle's reaction time can be reduced for such unexpected actions by prioritizing processing of sensor data for processing to determine whether an actor that appears to be starting to act in an unexpected way, continues to do so. In some embodiments, the autonomous vehicle can also initiate a preemptive action, such as braking, while this determination is being made. In some embodiments, the system can provide high precision (e.g., a low rate of false positives in which corrective action is unnecessarily taken). Such precision can be balanced against recall (e.g., result in a slight decrease in recall). Recall can be parameterized with respect to a desired rate of false negatives, in which a corrective action should be taken but is not taken (at least by this process and/or sub-system). In other words, the system can improve precision with a small reduction in recall. Thus, the present disclosure provides for a computing system having reduced reaction time and/or the ability to detect and correct poorly predicted trajectories for actors.

More particularly, an autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a computing system located onboard the autonomous vehicle to help control the autonomous vehicle. The computing system can be located onboard the autonomous vehicle, in that the computing system can be located on or within the autonomous vehicle. The computing system can include one or more sensors, an autonomy computing system (e.g., for determining autonomous navigation), one or more vehicle control systems (e.g., for controlling braking, steering, powertrain, etc.), and/or other systems. The computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

The computing system can receive sensor data from one or more sensors that are coupled to or otherwise included within the autonomous vehicle. For example, in some implementations, a perception system can be included within the computing system and configured to receive the sensor data. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system.

In addition to the sensor data, the computing system (e.g., the perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the computing system in comprehending and perceiving its surrounding environment and its relationship thereto.

According to aspects of the present disclosure, a computing system can be configured to detect an actor surprise movement. The computing system can execute a plurality of compute cycles. The compute cycles can generally include obtaining sensor data, processing the sensor data to perceive an environment of the autonomous vehicle and identify actors in an environment of the autonomous vehicle, and predicting or forecasting future behavior of the identified actors. For a first compute cycle, the computing system can obtain motion forecast data with respect to an actor relative to an autonomous vehicle. The motion forecast data can be based on sensor data collected during the first compute cycle. The motion forecast data can describe one or more predicted paths or trajectories of the actor. Thus, the computing system can predict or forecast motion of the actor during the first compute cycle.

The computing system can determine failsafe region data that represents one or more unexpected areas and/or unexpected paths for the actor where a likelihood of the actor following the unexpected path or entering the unexpected area is below a threshold. The unexpected area(s) can be or include an area that the actor may foreseeably occupy in the near future, but that the actor is statistically unlikely to enter. Similarly, the unexpected path(s) can be or include paths or trajectories that the actor could foreseeably follow, but that the actor is statistically unlikely to follow.

More specifically, the likelihood that the actor will follow the unexpected path or enter the unexpected area can be below a threshold. The threshold can be empirically selected to maximize or optimize the effectiveness of the systems and methods described herein. For example, areas or paths having associated likelihoods above the threshold can be addressed more directly with an immediate action. For example, a vehicle that needs to merge because its lane is ending, has a high likelihood of entering an adjacent lane. In such an instance, the likelihood is probably above the threshold, such that an action addressing this actor's behavior (e.g., changing lanes, slowing down, etc.) can generally be decided without using the systems and methods described herein. Thus, the threshold can be selected such that the unexpected areas and unexpected paths are associated with unlikely action that are still statistically worth addressing as described herein.

The computing system can determine failsafe region data that represents the unexpected path and/or the unexpected area based on the motion forecast data and/or first sensor data. This failsafe region data can describe the location of the unexpected area and/or coordinates of the unexpected path. For instance, a pedestrian that is standing near a crosswalk and does not have current right of way to cross the street could nevertheless step into the crosswalk. The unexpected area can include or be defined as a portion of the crosswalk that is near the pedestrian. The pedestrian could be distracted and/or walking towards a crosswalk without slowing down and/or without looking up. This act can be statistically foreseeable based on pedestrians' actions in general (e.g., based on data collected by this autonomous vehicle and/or other autonomous vehicles). However, this act can also be unlikely as the pedestrian is statistically more likely to stop before stepping into traffic. As another example, a stopped car that does not have the right of way is unlikely to pull out in front of the autonomous vehicle, but this action is nevertheless statistically foreseeable. These actions can have a likelihood that is below the threshold yet still be foreseeable.

As another example, the computing system can identify the unexpected path by determining that the actor is deviating from a predicted path for the actor. The motion forecast data obtained by the computing system in the first compute cycle can describe one or more predicted paths for the actor. The unexpected path(s) for the actor can be defined as paths that are not sufficiently similar or included in the predicted path(s). Further, in some embodiments, the unexpected path(s) can be selected or defined as paths that intersect the trajectory of the autonomous vehicle.

For a second compute cycle that is later than the first compute cycle, the computing system can obtain sensor data (e.g., second sensor data) and determine based on the second sensor data and the failsafe region data, that the actor has followed the unexpected path or entered the unexpected area. For example, the computing system can determine that a current location of the actor is not consistent with a predicted path(s) for the actor. This determination can be based on a comparison of sensor data and/or spatial data points (e.g., image data, LIDAR data, Radar data, and/or other sensor data capable of representing spatial occupancy) that describes the current location of the actor with the motion forecast data that describes the predicted path(s). As another example, the computing system can detect the presence of the actor within the unexpected area based on sensor data indicative of the actor being within the unexpected area, such as spatial data points detected in the unexpected area.

In response to determining that the actor has followed the unexpected path or entered the unexpected area, the computing system can determine a deviation for controlling a movement of the autonomous vehicle. The deviation can include or describe a corrective action, such as braking, swerving, changing lanes, and the like. Thus, the autonomous vehicle can react to the actor's unexpected behavior.

In some implementations, the computing system can be configured to determine a motion plan for the autonomous vehicle in the first compute cycle in response to the unexpected path or unexpected area being identified when the failsafe region data is determined. In the second compute cycle, if the computing system determines that the actor has, in fact, entered the unexpected area or followed the unexpected path, the computing system can execute the motion plan from the earlier, first compute cycle (as opposed to a motion plan generated during the second compute cycle). Executing the motion plan from the first compute cycle can reduce the reaction time of the autonomous vehicle to the unexpected behavior of the actor as the motion plan generated during the first compute cycle can be made available sooner than another motion plan generated in the second compute cycle.

More particularly, for the second compute cycle, the computing system can determine, based on the second sensor data, a first motion plan representing the movement of the autonomous vehicle. The first motion plan can be determined in a normal operating flow of the autonomous computing system (e.g., that does not account for the foreseeable yet unexpected behavior of the actor). For instance, the first motion plan can include continuing in a current lane of the autonomous vehicle under the assumption that the pedestrian will not step out into the crosswalk or that the vehicle will not pull out in front of the autonomous vehicle. However, during the earlier first compute cycle, the computing system can determine a second motion plan that includes a reaction to the unexpected action (e.g., that includes braking or changing lanes if the pedestrian steps into the cross walk or vehicle pulls out). Thus, determining the deviation for controlling the movement of the autonomous vehicle, in the second compute cycle, can include obtaining a second motion plan that is determined during the first compute cycle in response to determining that the actor has followed the unexpected path or entered the unexpected area.

For example, in some embodiments, the computing system can replace the first motion plan (from the second compute cycle) with the second motion plan (from the first compute cycle) for controlling the movement of the autonomous vehicle. Thus, the computing system can be configured to control the autonomous vehicle based on the second motion plan from the earlier, first compute cycle instead of the second motion plan (from the first compute cycle) to more rapidly address the actor's unexpected behavior (e.g., entering the unexpected area or following the unexpected path).

In some implementations, the portion(s) of the second sensor data including and/or corresponding with the unexpected area(s) and/or path(s) can be prioritized for processing to more quickly determine whether the actor has followed the unexpected path and/or entered the unexpected area. For example, a portion of the second sensor data that corresponds with the unexpected area and/or path can be processed without processing all of the second sensor data from the second compute cycle. By delaying and/or preventing processing of other portions of the second sensor data that do not correspond with the unexpected area and/or path, the speed can be increased at which the computing system can make the more critical determination regarding the unexpected behavior. Thus, the reaction time of the autonomous vehicle can be improved.

In some implementations, before obtaining the second sensor data, the computing system can adjust a sensor to collect additional data that corresponds with the unexpected path or the unexpected area as compared with the first sensor data. For example, a field of view of a camera can be physically or digitally adjusted (e.g., zoomed, focused, directed, etc.) with respect to the unexpected path or unexpected area. As another example, a spatial data sensor (e.g., LIDAR sensor, Radar sensor, etc.) can be configured to collect additional spatial data points, such as LIDAR points, (e.g., in a subsequent LIDAR sweep) in the unexpected path or area such that the second sensor data includes additional resolution with respect to the unexpected path or area. Thus, the computing system can be configured to adjust one or more sensors to improve detection of the actor (e.g., in the second compute cycle) along the unexpected path or within the unexpected area.

In some implementations, the computing system can be configured to take preliminary action (e.g., braking, changing direction, and the like) in response to identifying the unexpected path or the unexpected area but before the actor is actually detected on the unexpected path or in the unexpected area. More specifically, before the second compute cycle and in response to determining the failsafe region data, the computing system can determine a preliminary deviation for controlling the movement of the autonomous vehicle. The autonomous vehicle can begin to execute the preliminary deviation until the computing system has determined whether the actor has followed the unexpected path or entered the unexpected area in the second compute cycle. For example, the computing system can begin braking in response to detecting a pedestrian that is standing near a crosswalk before the pedestrian is detected in the crosswalk. Thus, in some implementations, the computing system can facilitate a preliminary action in response to identifying the unexpected path or the unexpected area and/or determining that an actor may follow the unexpected path or enter the unexpected area.

In some implementations, as a failsafe or contingency method of predicting an actor's path, when the actor is following the unexpected path or entering the unexpected area, the computing system can predict the actor's trajectory using a different and/or simpler approach than previously employed and take corrective action based on this trajectory. As one example, the computing system can determine a simple ballistic trajectory or a quadratic regression trajectory (e.g., based on the actor's previous locations, current heading, speed, and the like). The computing system can generate a prediction failsafe signal for controlling the movement of the autonomous vehicle based on this predicted trajectory for the actor. The prediction failsafe signal can include braking, changing direction, changing lines or the like.

To generate the prediction failsafe signal, the computing system can evaluate motion forecast data (e.g., obtained under a normal prediction processing flow) based on subsequently obtained sensor data that describes the movements of the actor. For example, the motion forecast data can describe one or more predicted paths or trajectories (e.g., time-based location coordinates) for the actor over a short time interval (e.g., one to five seconds). During this short time interval, the computing system can compare the predicted path for the actor with an actual path that the actor is observed to follow (as described by subsequent sensor data). Based on this comparison, the computing system can evaluate the accuracy of the previously generated motion forecast data and/or establish a confidence value for future motion forecast data generated for the actor (e.g., using the normal prediction processing flow). Thus, the computing system (or another computing system in communication therewith) can evaluate its own performance for forecasting paths or trajectories for individual actors.

In some implementations, the computing system can intermittently and/or regularly evaluate motion forecast data generated for actors to determine when such data is unreliable. The computing system can compare a current location of the actor described by sensor data with motion forecast data obtained based on previously obtained sensor data for multiple compute cycles. The computing system can determine the likelihood of the actor following the unexpected path or entering the unexpected area based on the comparisons of the current location of the actor described by sensor data with the motion forecast data obtained based on previous sensor data. For example, given the computing system can predict the likelihood of failing to accurately predict the trajectory of a given actor in a current cycle, $E[\theta|X]$, given k observed failure in the past n cycles as follows:

$$E[\theta|X] = \frac{k+1}{n-k+1+k+1} = \frac{k+1}{n+2}$$

Thus, the computing system can establish a confidence or likelihood of accuracy for predicting actor trajectories (e.g., using the normal prediction processing flow). This confidence can be used to determine when to rely on such data and when to employ an alternate method (e.g., ballistic, quadratic regression, and/or other fallback predicted trajectories), for example, in response to detecting that the actor has followed the unexpected path.

Example aspects of the present disclosure can provide a number of technical effects and benefits, including improvements to computing systems. For example, aspects of the present disclosure can reduce computational resources and/or reduce latency needed to control movement of the autonomous vehicle. As described herein, unexpected movements can be detected with reduced latency. More particularly, the computing system can determine, for a first compute cycle based on motion forecast data, failsafe region data representing an unexpected path or an unexpected area where a likelihood of the actor following the unexpected path or entering the unexpected area is below a threshold. Next, for the second compute cycle, the computing system can obtain second sensor data and determine, based on the second sensor data and the failsafe region data, that the actor has followed the unexpected path or entered the unexpected area. In response to determining that the actor has followed the unexpected path or entered the unexpected area, determining a deviation for controlling a movement of the autonomous vehicle. Identifying the unexpected path(s) and/or unexpected area(s) in the first compute cycle, can improve the speed of detection and response in the second compute cycle when the unexpected behavior is actually detected. Furthermore, in some implementations, the computing system can determine a motion plan and/or implement a preliminary deviation (such as braking or changing directions) before the unexpected behavior is actually detected in the second compute cycle. Thus, the reaction time of the autonomous vehicle can be improved thereby improving safety.

Further, as another example of technical effects and benefits, aspects of the disclosure are directed to detecting when the computing system is forecasting paths or trajectories for actors that are not sufficiently accurate. In such embodiments, the computing system can employ an alternative trajectory projecting method, such as a simple ballistic method or quadratic regression method. Such alternative methods can be employed as a failsafe measure when unexpected behavior is detected for an actor or likely for an actor. Thus, the present disclosure can improve safety by detecting and addressing poorly forecasted paths for actors.

Various means can be configured to perform the methods and processes described herein. For example, a computing system can include sensor data obtaining unit(s), trajectory/behavior forecasting unit(s), and vehicle controlling unit(s) for performing the operations and functions described herein. Additional examples include machine-learned model unit(s), operator communication unit(s), data storing unit(s), and/or other means. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the one or more actors near the autonomous vehicle, autonomous vehicle's surrounding environment, and the position and movement of the autonomous vehicle. In some implementations, the means can be configured to obtain spatial data points (e.g., LIDAR data) (e.g., a three-dimensional point cloud) from a sensor system (e.g., LIDAR system) and/or control aspects of the operation of the sensor system, such as scan rate, point density in unexpected areas and/or paths, and the like. In some implementations, the means can be configured to obtain image data obtained from one or more cameras. In some implementations, the means can be configured to obtain a birds-eye view representation of data obtained relative to the autonomous vehicle. A sensor data obtaining unit is one example of a means for obtaining the first sensor data collected during the first compute cycle and the second sensor data collected during the second compute cycle, as described herein.

The means can be configured to provide inputs to one or more machine-learned models, such as object detection model, 3D localization models, tracking and/or fusion models, maturing models, prediction models, planning models, plan validation models, and control models. A machine learned model unit is one example of a means for providing various inputs to the machine learned models and receiving multiple outputs therefrom.

More particularly, in some embodiments, the means can be configured to obtain motion forecast data based on first sensor data collected during the first compute cycle and with respect to an actor relative to an autonomous vehicle. The sensor data obtaining unit is one example of a means for collecting first sensor data during the first compute cycle. The trajectory/behavior forecasting unit is one example of a means for obtaining the motion forecast data based on the first sensor data.

The means can be configured to determine, based on the motion forecast data, failsafe region data representing an unexpected path or an unexpected area where a likelihood of the actor following the unexpected path or entering the unexpected area is below a threshold. A surprise movement unit is one example of a means for determining the failsafe region data based on the motion forecast data.

The means can be configured to determine, based on the second sensor data and the failsafe region data, that the actor has followed the unexpected path or entered the unexpected area. For example, the means can identify spatial data points (e.g., LIDAR points, RADAR points, image pixels, etc.) in the unexpected area or along the unexpected path that indicate that the actor has followed the unexpected path or entered the unexpected area. The sensor data obtaining unit is one example of a means for collecting second sensor data during the second compute cycle. The surprise movement unit is one example of a means for determining that the actor has followed the unexpected path or entered the unexpected area based on the second sensor data.

The means can be configured to determine a deviation for controlling a movement of the autonomous vehicle in response to determining that the actor has followed the unexpected path or entered the unexpected area. For example, the means can determine a deviation that includes applying the brake or turning the autonomous vehicle (e.g., to change lanes). The surprise movement unit is one example of a means for determining the deviation for controlling the movement of the autonomous vehicle in response to determining that the actor has followed the unexpected path or entered the unexpected area. The motion planning unit is another example of a means for determining the deviation for controlling the movement of the autonomous vehicle in response to determining that the actor has followed the unexpected path or entered the unexpected area.

The means can be configured to control one or more vehicle controls (e.g., actuators or other devices that control gas flow, steering, braking, etc.) to execute the deviation for controlling the movement of the autonomous vehicle. A vehicle controlling unit is one example of a means for controlling motion of the autonomous vehicle to execute the motion plan.

In some embodiments, the means can be configured to access or otherwise obtain map data associated with a surrounding geographic environment of the autonomous vehicle. The map data can be used locate unexpected areas and/or determine unexpected paths for actors. As examples, the map data can include locations of crosswalks, blind driveways, and other features that can be considered when identifying unexpected areas and/or unexpected paths. More particularly, in some implementations, the means can be configured to access or otherwise obtain map data that provides information regarding: the identity and location of different roadways, road segments, buildings, or other items or objects (e.g., lampposts, crosswalks, and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the computing system in processing, analyzing, and perceiving likely locations and/or paths of nearby actors, the surrounding environment, and the autonomous vehicle's relationship thereto. In some implementations, the means can be configured to access or otherwise obtain map data that is provided in a birds-eye view representation, such as generated by rasterization or other suitable processing format. A map data obtaining unit is one example of a means for obtaining such map data as described herein.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the sensor data 140 can include image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the surprise movement system 185, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 X degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI (Human Machine Interface) 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

The vehicle computing system 100 can include a surprise movement system 185. As illustrated in FIG. 1, the surprise movement system 185 can be implemented onboard the vehicle 105 (e.g., as a portion of the vehicle computing system 100). Moreover, in some implementations, the surprise movement system 185 can be remote from the vehicle 105 (e.g., as a portion of an operations computing system 195). The surprise movement system 185 can determine one or more object intention(s) associated with objects within the surrounding environment of the vehicle 105, as described in greater detail herein. In some implementations, the surprise movement system 185 can be configured to operate in conjunction with the vehicle autonomy system 130. For example, the surprise movement system 185 can send data to and receive data from the vehicle autonomy system 130. In some implementations, the surprise movement system 185 can be included in or otherwise a part of a vehicle autonomy system 130. The surprise movement system 185 can include software and hardware configured to provide the functionality described herein. In some implementations, the surprise movement system 185 can be implemented as a subsystem of a vehicle computing system 100. Additionally, or alternatively, the surprise movement system 185 can be implemented via one or more computing devices that are remote from the vehicle 105. Example surprise movement system 185 configurations according to example aspects of the present disclosure are discussed in greater detail with respect to FIGS. 2-3B.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. For instance, any vehicle may utilize the technology described herein for detecting surprise actor movements. For example, a non-autonomous vehicle may utilize aspects of the present disclosure to determine the intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on the surprise movement detection. Additionally, or alternatively, the disclosed technology can be implemented and utilized by other computing systems, such as other robotic computing systems.

Figure 2:
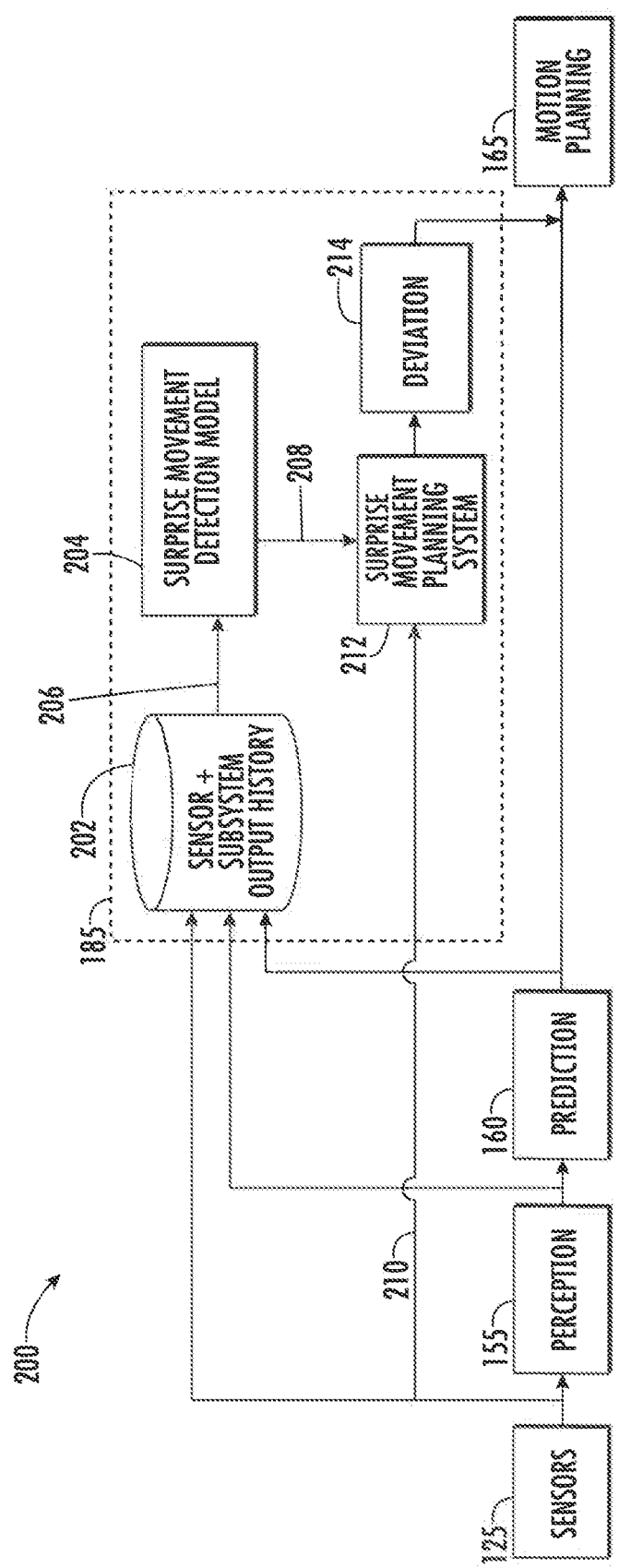
FIG. 2 depicts an example data flow diagram of an example system for detecting an actor surprise movement according to example implementations of the present disclosure.

FIG. 2 depicts a simplified example data flow diagram of an example system 200 for detecting an actor surprise movement according to example implementations of the present disclosure. The system 200 can include the surprise movement system 185, the sensor(s) 125, the perception system 155, the prediction system 160, and the motion planning system 165.

The surprise movement system 185 perform one or more of the steps of the method 600 described below with respect to FIG. 6. The surprise movement system 185 include receiving data from the sensors 125, the perception system 155, and/or the prediction system 160. The surprise movement system 185 can store the data received from the sensors 125, the perception system 155, and the prediction system 160 in a database 202 including one or more memory devices. The database 202 can maintain a history of data received from the sensors 125, the perception system 155, and/or the prediction system 160. A surprise movement detection model 204 can receive data 206 from the database 202, for example, including motion forecast with respect to an actor (e.g., from the perception system 155) based on first sensor data collected during a first compute cycle (e.g., by the sensor(s) 125). The surprise movement system 185 can include determining, based on the motion forecast data (included in data 206), failsafe region data 208 representing an unexpected path or an unexpected area where a likelihood of the actor following the unexpected path or entering the unexpected area is below a threshold.

For a second compute cycling that is later than the first compute cycle, the surprise movement system 185 can perform a second set of operations. The second set of operations can include obtaining second sensor data 210. Collection and storage of the first sensor data and/or second sensor data can be facilitated by the database 202. A surprise movement planning system 212 can determine, based on the second sensor data 210 and the failsafe region data 208, that the actor has followed the unexpected path or entered the unexpected area. The surprise movement planning system 212 can determine a deviation 214 for controlling a movement of the autonomous vehicle in response to determining that the actor has followed the unexpected path or entered the unexpected area. The deviation 214 can include or describe a corrective action, such as braking, swerving, changing lanes, and the like. In some embodiments, the surprise movement planning system 212 can be distinct from the motion planning system 165. However, in other embodiments, the surprise movement planning system 212 can be included in the motion planning system 165 or any other suitable system described herein.

The motion planning system 165 can receive the deviation 214 and control movement of the autonomous vehicle based on the deviation. For example, the motion planning system 165 can determine a first motion plan representing the movement of the autonomous vehicle based on the second sensor data. The motion planning system 165 can obtain a second motion plan that is determined during the first compute cycle (for example based on the deviation 214) in response to determining that the actor has followed the unexpected path or entered the unexpected area. The motion planning system 165 can replace the first motion plan with the second motion plan for controlling the movement of the autonomous vehicle.

Figure 3A:
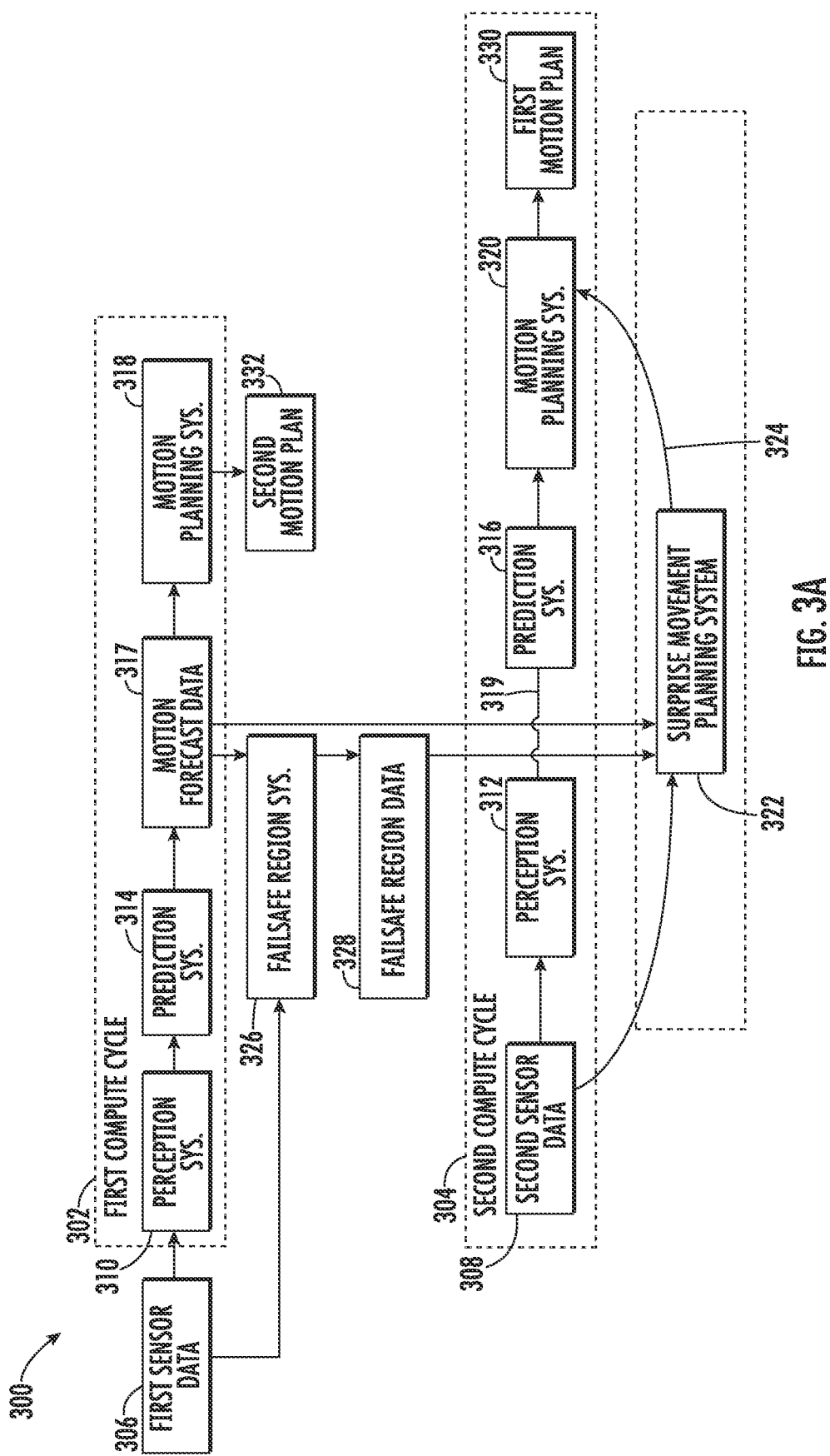
FIG. 3A depicts a simplified flow chart of an example implementation of a method for detecting an actor surprise movement with respect to an autonomous vehicle.

FIG. 3A depicts a simplified flow chart of an example implementation of a method 300 for detecting an actor surprise movement with respect to an autonomous vehicle. The method 300 can include performing a plurality of compute cycles including a first compute cycle 302 and a second compute cycle 304. The compute cycles 302, 304 can generally include obtaining sensor data (respectively at 306, 308). The compute cycles 302, 304 can include processing the sensor data to perceive an environment of the autonomous vehicle and identify actors in an environment of the autonomous vehicle (e.g., by the perception model 155 described above with reference to FIGS. 1 and 2). For example, the sensor data 306, 308 can be input into one or more object detection models 310, 312. The compute cycles 302, 304 can include predicting or forecasting future behavior of the identified actors. For example, object detection data can be received from the object detection system(s) 310, 312 and input into the prediction system(s) 314, 316 (which can correspond with prediction system 160 described above with respect to FIGS. 1 and 2). The prediction system(s) 314, 316 can receive data from the perception system 160 (e.g., including the object detection system(s) 310, 312) and output motion forecast data 317, 319 that describes predicted trajectories of one or more actors near the autonomous vehicle for use by the motion planning system(s) 318, 320.

For the first compute cycle 302, the computing system can the obtain motion forecast data 317 with respect to an actor relative to an autonomous vehicle. The motion forecast data 317 can be based on the first sensor data 306 collected during the first compute cycle 302. The motion forecast data 317 can describe one or more predicted paths or trajectories of the actor. Thus, the computing system can predict or forecast motion of the actor during the first compute cycle 302.

The computing system (e.g., a failsafe region system 326) can determine failsafe region data 328 based on the motion forecast data 317 and/or the first sensor data 306. The failsafe region data 328 can represent or describe one or more unexpected areas and/or unexpected paths for the actor where a likelihood of the actor following the unexpected path or entering the unexpected area is below a threshold, for example as described below with reference to FIG. 5A. The unexpected area(s) can be or include an area that the actor may foreseeably occupy in the near future, but that the actor is statistically unlikely to enter. Similarly, the unexpected path(s) can be or include paths or trajectories that the actor could foreseeably follow, but that the actor is statistically unlikely to follow.

The failsafe region data 328 can describe the location of the unexpected area (for example as described with reference to FIG. 5B) and/or coordinates of the unexpected path (for example as described with reference to FIG. 5A). For instance, a pedestrian that is standing near a crosswalk and does not have current right of way to cross the street could nevertheless step into the crosswalk. The unexpected area can include or be defined as a portion of the crosswalk that is near the pedestrian. As another example, a stopped car that does not have the right of way is unlikely to pull out in front of the autonomous vehicle, but this action is nevertheless statistically foreseeable. These actions can have a likelihood that is below the threshold yet still be foreseeable.

For the second compute cycle 304 (after the first compute cycle 302), the computing system can obtain second sensor data 308 and determine based on the second sensor data 308 and the failsafe region data 328, that the actor has followed the unexpected path or entered the unexpected area. For example, the movement planning system(s) computing system can determine that a current location of the actor (e.g., as described by the second sensor data 308) is not consistent with a predicted path(s) for the actor. This determination can be based on a comparison of the second sensor data 308 (which can describe the current location of the actor) with the motion forecast data 317 that describes the predicted path(s). As another example, the computing system can detect the presence of the actor within the unexpected area based on the second sensor data 308 being indicative of the actor being within the unexpected area. For instance, the second sensor data 308 can include spatial data points (e.g., LIDAR data, Radar data, or other sensor data capable of representing spatial occupancy) detected in the unexpected area.

In response to determining that the actor has followed the unexpected path or entered the unexpected area, the computing system (e.g., a surprise movement planning system 322) can determine a deviation 324 for controlling a movement of the autonomous vehicle. The deviation 324 can include or describe a corrective action, such as braking, swerving, changing lanes, and the like. Thus, the autonomous vehicle can react to the actor's unexpected behavior. In some embodiments, the surprise movement planning system 322 can be distinct from the motion planning system(s) 318, 320. However, in other embodiments, the surprise movement planning system 212 can be included in the motion planning system(s) 318, 320 or any other suitable system described herein.

In some implementations, the computing system (e.g., motion planning system(s) 318, 320 and/or the surprise movement planning system 322) can be configured to determine a motion plan for the autonomous vehicle in the first compute cycle 302 (e.g., second motion plan 332) in response to the unexpected path or unexpected area being identified when the failsafe region data is determined. In the second compute cycle 304, if the computing system determines that the actor has, in fact, entered the unexpected area or followed the unexpected path, the computing system can execute a motion plan from the earlier, first compute cycle 302 (e.g., based on the deviation 324 output by the surprise movement planning system 322) instead of the motion plan generated during the second compute cycle 304 (e.g., by the motion planning model 320). Executing a motion plan from the first compute cycle 302 can reduce the reaction time of the autonomous vehicle to the unexpected behavior of the actor as the motion plan generated during the first compute cycle 302 can be made available sooner than the first motion plan 330 generated in the second compute cycle 304 (e.g., according to a normal data processing flow of the second compute cycle).

More particularly, for the second compute cycle 304, the motion planning system(s) 320 can determine, based on the second sensor data 308, the first motion plan 330 representing the movement of the autonomous vehicle. The first motion plan 330 can be determined in a normal operating flow of the autonomous computing system (e.g., that does not account for the foreseeable yet unexpected behavior of the actor). For instance, the first motion plan 330 can include continuing in a current lane of the autonomous vehicle under the assumption that the pedestrian will not step out into the crosswalk or that the vehicle will not pull out in front of the autonomous vehicle. However, during the earlier first compute cycle 302, the motion planning system(s) 318 and/or surprise movement planning system 322 can determine the second motion plan 332 that includes a reaction to the unexpected action (e.g., that includes braking or changing lanes if the pedestrian steps into the cross walk or vehicle pulls out). Thus, determining the deviation 324 for controlling the movement of the autonomous vehicle, in the second compute cycle 304, can include obtaining a second motion plan 332 that is determined during the first compute cycle 302 (e.g., by the motion planning system 318 and/or surprise movement planning system 322) in response to determining that the actor has followed the unexpected path or entered the unexpected area.

In some embodiments, the computing system can replace the first motion plan 330 (from the second compute cycle) with the second motion plan 332 (from the first compute cycle) for controlling the movement of the autonomous vehicle. Thus, the computing system can be configured to control the autonomous vehicle based on the second motion plan 332 from the earlier, first compute cycle instead of the second motion plan 332 (from the first compute cycle) to more rapidly address the actor's unexpected behavior (e.g., entering the unexpected area or following the unexpected path).

In some implementations, the portion(s) of the second sensor data 308 including and/or corresponding with the unexpected area(s) and/or path(s) can be prioritized for processing to more quickly determine whether the actor has followed the unexpected path and/or entered the unexpected area. For example, a portion of the second sensor data 308 that corresponds with the unexpected area and/or path can be processed without processing all of the second sensor data 308 from the second compute cycle 304. By delaying and/or preventing processing of other portions of the second sensor data 308 that do not correspond with the unexpected area and/or path, the speed can be increased at which the computing system can make the more critical determination regarding the unexpected behavior. Thus, the reaction time of the autonomous vehicle can be improved.

In some implementations, before obtaining the second sensor data 308, the computing system can adjust a sensor 125 (FIG. 1) to collect additional data that corresponds with the unexpected path or the unexpected area as compared with the first sensor data 306. For example, a field of view of a camera can be physically or digitally adjusted (e.g., zoomed, focused, directed, etc.) with respect to the unexpected path or unexpected area. As another example, a spatial data sensor (e.g., LIDAR sensor, Radar sensor, camera) can be configured to collect additional spatial data points (e.g., LIDAR points, Radar data points, pixels), for example in a subsequent LIDAR sweep in the unexpected path or area such that the second sensor data 308 includes additional resolution with respect to the unexpected path or area. Thus, the computing system can be configured to adjust one or more sensors 125 (FIG. 1) to improve detection of the actor (e.g., in the second compute cycle 304) along the unexpected path or within the unexpected area.

Figure 3B:
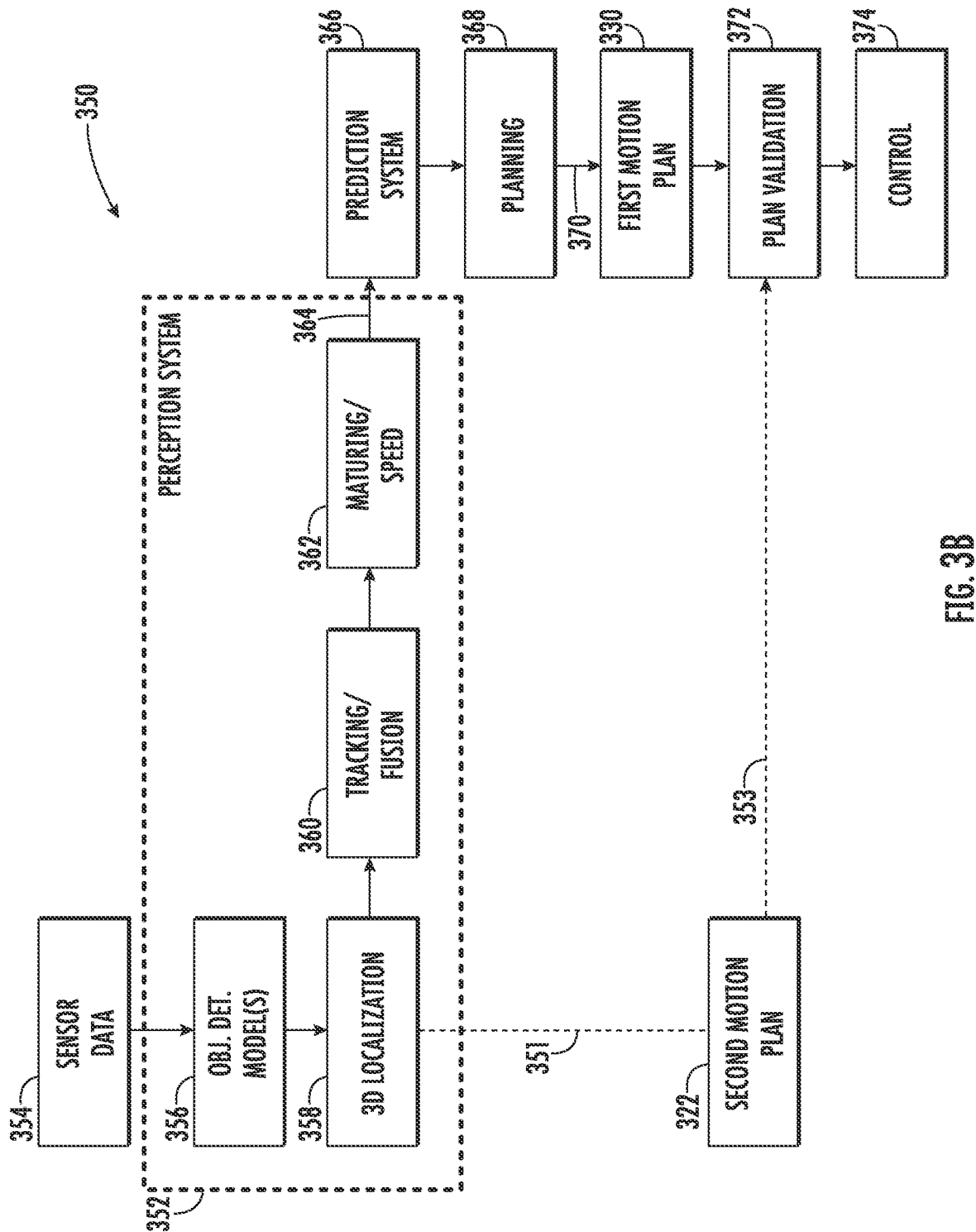
FIG. 3B depicts a simplified flow chart of an example implementation of a method for detecting an actor surprise movement with respect to an autonomous vehicle.

FIG. 3B illustrates another simplified flow chart of an example method 350 for detecting an actor surprise movement with respect to an autonomous vehicle. More specifically, FIG. 3B schematically illustrates a reduction in reaction time and/or latency achieved according to the present disclosure. A normal data processing flow is represented by the solid arrows, and an alternative data processing flow having reduced latency and/or reaction time can be represented, in part, by dashed arrows 351, 353.

The normal data processing flow can include processing sensor data 354 using a perception system 352. The perception system 352 can include one or more model(s) and/or sub-systems. For example, the perception system 352 can include one or more object 360, and/or maturing/speed system 362. A prediction system 366 can receive data from the perception system 352. The prediction system 366 can output motion forecast data 364 that describes predicted trajectories of one or more actors near the autonomous vehicle for use by a planning system(s) 368. The planning system(s) 368 can output data describing the first motion plan 330 that can be received by a plan validation system 372. The plan validation system 372 can compare the first motion plan 330 with one or more criteria to validate the first motion plan 330 (e.g., for feasibility and/or safety). A control system 374 can receive data describing the validated motion plan 372 and control movement of the autonomous vehicle.

The alternative data processing flow can have reduced latency and/or reaction time by omitting or skipping processing by one or more models and/or systems as compared with the normal data processing flow. For example, data received from the perception system 352 (e.g., the 3D location system 358) can be processed and/or transmitted (as represented by the dashed arrow 351, 353) to the plan validation system 372. The second motion plan 332 (e.g., as described above with reference to FIG. 3A) can be determined based on the data 351 (e.g., failsafe region data) received from the perception system 352. The second motion plan 332 can describe a deviation and/or reaction to the unexpected action. The second motion plan 332 can replace the first motion plan 330 for input to the plan validation system 372. Data describing a validated first motion plan 330 can be transmitted from the plan validation system 372 to the control system 374. Thus, latency associated with the alternative data processing flow can be less than a latency associated with the primary data processing flow.

Figure 4C:
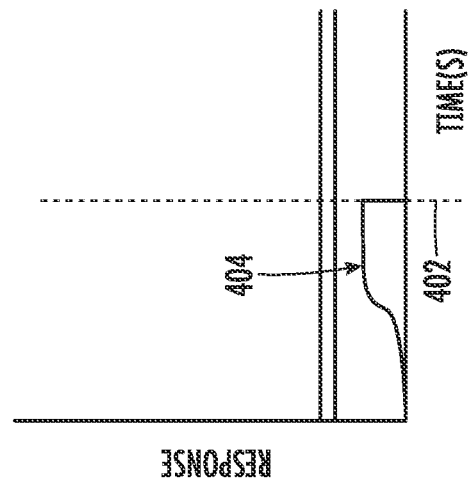
FIGS. 4A through 4C illustrate an example braking response described by a preliminary deviation according to example implementations of the present disclosure.
Figure 4B:
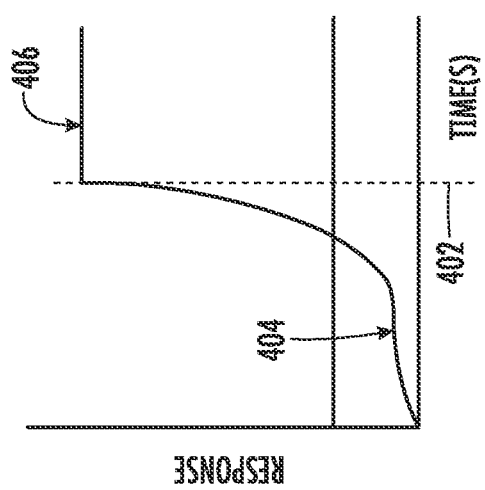
Figure 4A:
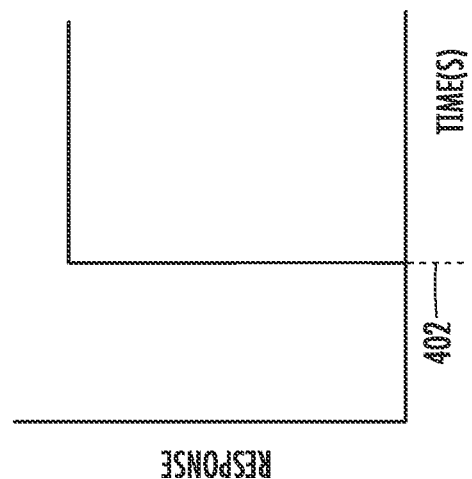

Referring to FIGS. 4A through 4C, in some implementations, the computing system can be configured to take preliminary action (e.g., braking, changing direction, and the like) in response to identifying the unexpected path or the unexpected area but before the actor is actually detected on the unexpected path or in the unexpected area. More specifically, FIGS. 4A through 4C illustrate a series of example braking responses to illustrate a preliminary action or deviation. For comparison, FIG. 4A illustrates a scenario in which a preliminary deviation is not employed. In this example, low probability evidence that an actor may follow an unexpected path or enter an unexpected area can be ignored until the actor is detected along the unexpected path or in the unexpected area. A motion plan can be implemented according to the systems and methods described herein. For example, the second motion plan 332 from the first compute cycle 302 can replace the first motion plan 330 from the second compute cycle 304 as described above with reference to FIGS. 3A and 3B. This method can nonetheless improve response time and/or reaction time of the computing system, as compared with conventional systems.

FIGS. 4B and 4C illustrate two example scenarios in which preliminary actions are executed. More specifically, the computing system can determine a preliminary deviation for controlling the movement of the autonomous vehicle before the second compute cycle and in response to determining the failsafe region data. The autonomous vehicle can execute the preliminary deviation until the computing system has determined whether the actor has followed the unexpected path or entered the unexpected area in the second compute cycle. Thus, the preliminary deviation can further improve the reaction time of the autonomous vehicle to low likelihood events as a precaution.

For example, referring to FIG. 4B, the system can begin braking in response to detecting a pedestrian that is standing on the edge of a sidewalk near a crosswalk before the pedestrian is detected in the crosswalk (for example as described below with reference to FIGS. 5B and 5C). Thus, in some implementations, the computing system can facilitate a preliminary action in response to identifying the unexpected path or the unexpected area and/or determining that an actor may follow the unexpected path or enter the unexpected area. In this example, the computing system then determines that the actor has followed the unexpected path or entered the unexpected area (e.g., based on the second sensor data and/or the failsafe region data). The computing system can determine a main deviation 406 (including a strong braking response) for controlling the movement of the autonomous vehicle in response to determining that the actor has followed the unexpected path or entered the unexpected area. Thus, before the time 402 at which surprise motion plan is implemented based on the actor being detected to be following the unexpected path or inside the unexpected area, the computing system can implement the preliminary deviation to further improve the reaction of the autonomous vehicle.

FIG. 4C illustrates a scenario in which the preliminary deviation is implemented as described above with reference to FIG. 4B, but the actor is not detected as following the unexpected path or entering the unexpected area. In this example, the preliminary deviation can include a braking response before the time 402 when the second sensor data is detected indicating a threshold probability of the actor entering the unexpected area or following an unexpected path. When the actor is not detected as following the unexpected path or entering the unexpected area, at time 402, the braking response can return to zero. In this example, the preliminary deviation is implemented as a precaution, which can be stopped once the actor is detected as not entering the unexpected area and/or following the unexpected path.

Figure 5A:
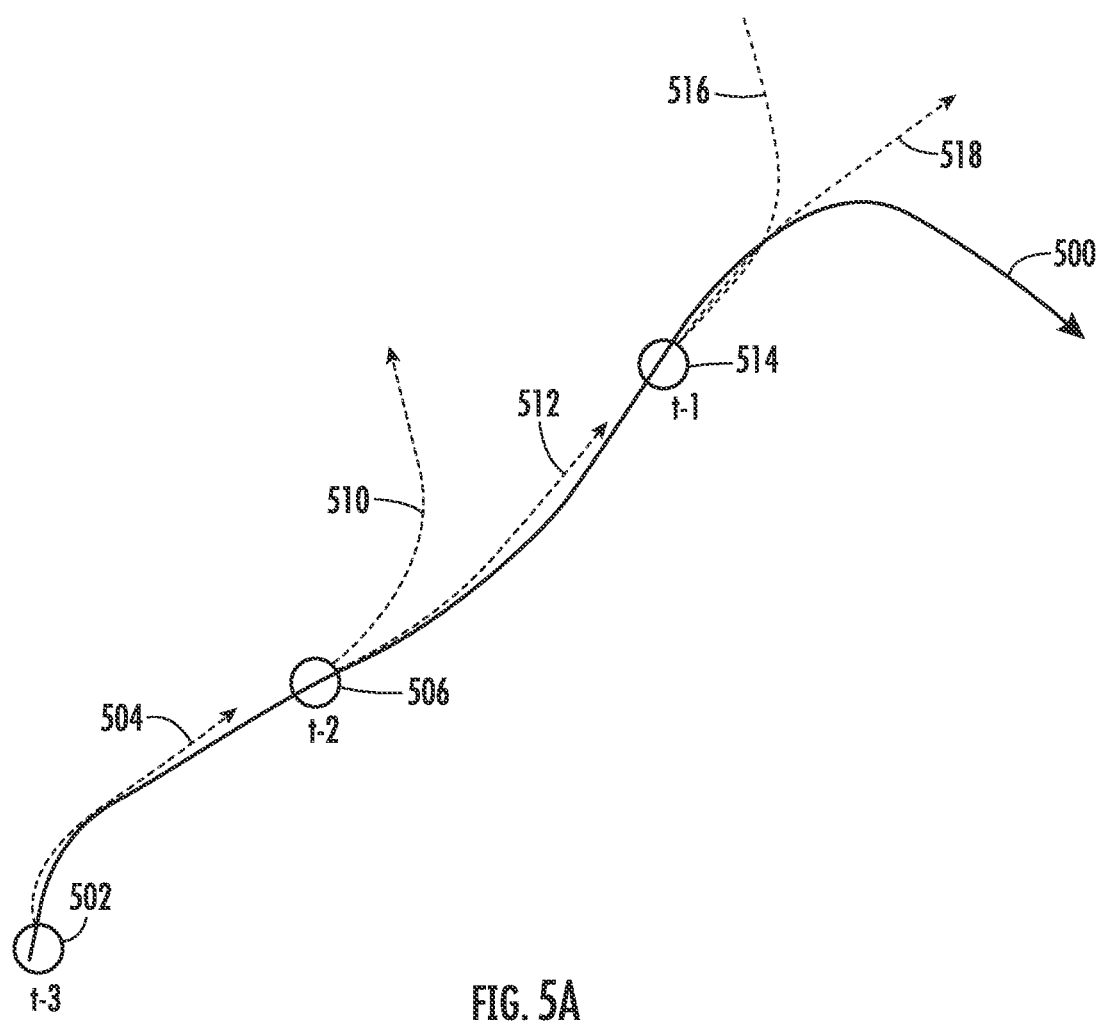
FIG. 5A depicts an example actor path and a series of example forecast paths according to example implementations of the present disclosure.
Figure 5C:
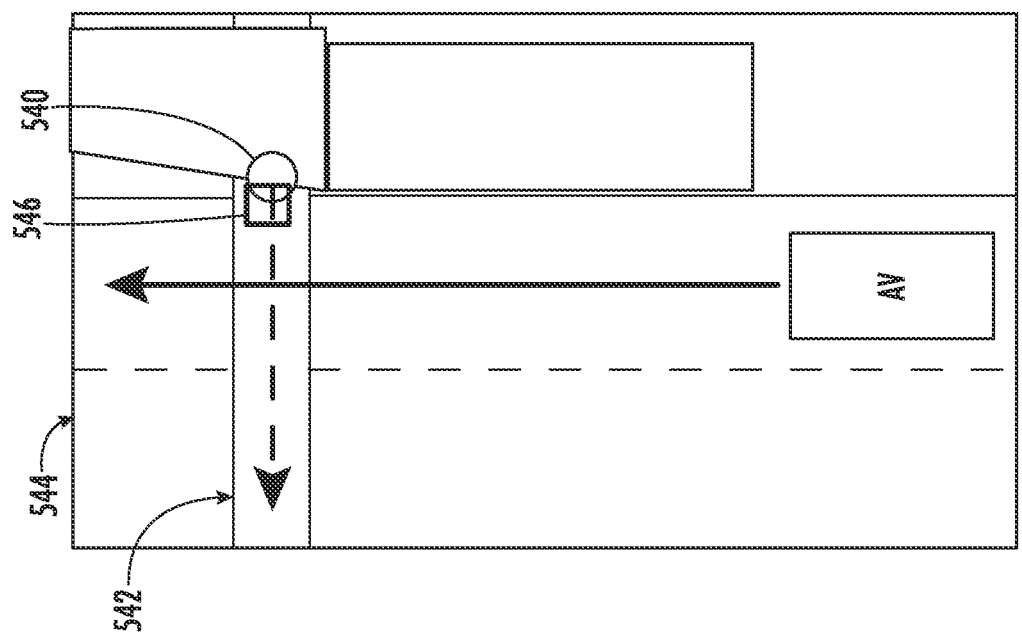
FIG. 5C depicts a simplified example top down view of an actor entering an unexpected area according to example implementations of the present disclosure.

FIG. 5A depicts an example actor path 500 (e.g., as depicted in sensor data) and a series of example forecast paths according to example implementations of the present disclosure. The computing system can determine that the actor is following an unexpected path by determining that the actor is deviating from one or more predicted paths for the actor. The motion forecast data obtained by the computing system in the first compute cycle can describe one or more predicted paths for the actor. The unexpected path(s) for the actor can be defined as paths that are not sufficiently similar or included in the predicted path(s). Further, in some embodiments, the unexpected path(s) can be selected or defined as paths that intersect the trajectory of the autonomous vehicle.

More specifically, referring to FIG. 5A, at t−3 (502), a first predicted path 504 can be determined. The actor path 500 can be sufficiently similar to the first predicted path 504 from t−3 (502) to t−2 (506). Thus, during a time interval from t−3 (502) to t−2 (506) the computing system would not identify the actor as traversing an unexpected path. As a result, the computing system would not generate any failsafe region data during the time interval from t−3 (502) to t−2 (506).

From t−2 (506) to t−1 (508), the computing system can determine a second predicted path 510 and third predicted path 512. The actor path 500 can be sufficiently similar to the third predicted path 512 such that the actor is not observed to follow an unpredicted path. As a result, the computing system would not generate any failsafe region data during this time interval.

Lastly, over a subsequent interval beginning at T−1 (514) the computing system can determine a fourth predicted path 516 and a fifth predicted path 518. The actor path 500 can be unaligned and/or substantially dissimilar to each of the fourth predicted path 516 and the fifth predicted path 518. As such, the computing system can generate failsafe region data representing the unexpected path followed by the actor and detect that the actor has followed an unexpected path.

In some implementations, as a failsafe or contingency method of predicting an actor's path, when the actor is following the unexpected path or entering the unexpected area, the computing system can predict the actor's trajectory using a different and/or simpler approach than previously employed and take corrective action based on this trajectory. As one example, the computing system can determine a simple ballistic trajectory, quadratic regression trajectory, or other fallback predicted trajectories (e.g., based on the actor's previous locations, current heading, speed, and the like). The computing system can generate a prediction failsafe signal for controlling the movement of the autonomous vehicle based on this predicted trajectory for the actor. The prediction failsafe signal can include braking, changing direction, changing lines or the like.

To generate the prediction failsafe signal, the computing system can evaluate motion forecast data (e.g., obtained under a normal prediction processing flow) based on subsequently obtained sensor data that describes the movements of the actor, for example as described above with reference to FIG. 5A. For example, the motion forecast data can describe one or more predicted paths or trajectories (e.g., time-based location coordinates) for the actor over a short time interval (e.g., one to five seconds). During this short time interval, the computing system can compare the predicted path for the actor with an actual path that the actor is observed to follow, for example as described above with reference to FIG. 5A. Based on this comparison, the computing system can evaluate the accuracy of the previously generated motion forecast data and/or establish a confidence value for future motion forecast data generated for the actor (e.g., using the normal prediction processing flow). Thus, the computing system (or another computing system in communication therewith) can evaluate its own performance for forecasting paths or trajectories for individual actors.

In some implementations, the computing system can intermittently and/or regularly evaluate motion forecast data generated for actors to determine when such data is unreliable. The computing system can compare a current location of the actor described by sensor data with motion forecast data obtained based on previously obtained sensor data for multiple compute cycles. The computing system can determine the likelihood of the actor following the unexpected path or entering the unexpected area based on the comparisons of the current location of the actor described by sensor data with the motion forecast data obtained based on previous sensor data. For example, given the computing system can predict the likelihood of failing to accurately predict the trajectory of a given actor in a current cycle, E[θ|X], given k observed failure in the past n cycles as follows:

$$E[\theta|X] = \frac{k+1}{n-k+1+k+1} = \frac{k+1}{n+2}$$

Thus, the computing system can establish a confidence or likelihood of accuracy for predicting actor trajectories (e.g., using the normal prediction processing flow). This confidence can be used to determine when to rely on such data and when to employ an alternate method (e.g., ballistic, quadratic regression, and/or other fallback trajectory prediction methods), for example, in response to detecting that the actor has followed the unexpected path.

Figure 5B:
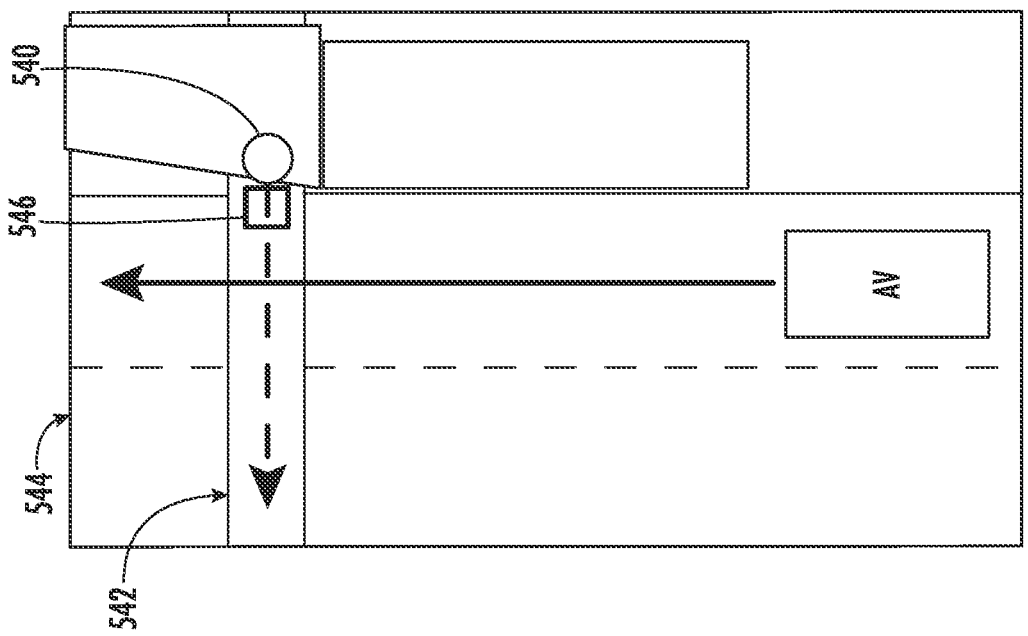
FIG. 5B depicts a simplified example top down view of an actor about to enter an unexpected area according to example implementations of the present disclosure.

FIG. 5B depicts a simplified example top down view of an example actor, a pedestrian 540, standing near an unexpected area according to example implementations of the present disclosure. For example, the pedestrian 540 that does not currently have the right of way can be standing on the edge of a sidewalk near the crosswalk 542 and/or be distracted. Alternatively, the pedestrian 540 could be walking towards the crosswalk 542 without slowing down. FIG. 5C depicts a simplified example top down view of the pedestrian 540 entering the unexpected area according to example implementations of the present disclosure. The pedestrian 540 could nevertheless step into the crosswalk 542, for example as illustrated in FIG. 5C. This act can be statistically foreseeable based on pedestrians' actions in general (e.g., based on data collected by this autonomous vehicle and/or other autonomous vehicles). However, this act can also be unlikely as the pedestrian is statistically more likely to stop before stepping into traffic. An unexpected area 546 can include or be defined as a portion of the crosswalk 542 that is near the pedestrian 540. Thus, the unexpected area 546 can be defined based on a variety of characteristics of the pedestrian 540 or other actor, such as location, attentive state (e.g., distracted, focused, etc.), and motion forecast data (e.g., describing speed, heading, and the like).

The likelihood that the actor will follow the unexpected path (e.g., as described above with reference to FIG. 5A) or enter the unexpected area (e.g., as described above with reference to FIGS. 5B and 5C) can be below a threshold. The threshold can be empirically selected to maximize or optimize the effectiveness of the systems and methods described herein. For example, areas or paths having associated likelihoods above the threshold can be addressed more directly with an immediate action. For example, a vehicle that has to merge because its lane is ending, has a high likelihood of entering an adjacent lane. In such an instance, the likelihood is probably above the threshold, such that an action addressing this actor's behavior (e.g., changing lanes, slowing down, etc.) can generally be decided without using the systems and methods described herein. Thus, the threshold can be selected such that the unexpected areas and unexpected paths (in response to unlikely actions of other actors) can be addressed as described herein.

FIG. 6 depicts an example flow diagram of an example method for detecting an actor surprise movement with respect to an autonomous vehicle according to example implementations of the present disclosure. For a first compute cycle 602 of a plurality of compute cycles, the method 600 can include obtaining, at 605, motion forecast data with respect to an actor relative to an autonomous vehicle. The motion forecast data can be based on first sensor data collected during the first compute cycle, for example as described above with reference to FIGS. 2-3B and 5A-5C. The sensor data obtaining unit, object detection unit, and/or motion planning unit are example means for obtaining motion forecast data with respect to an actor relative to the autonomous vehicle.

Figure 7:
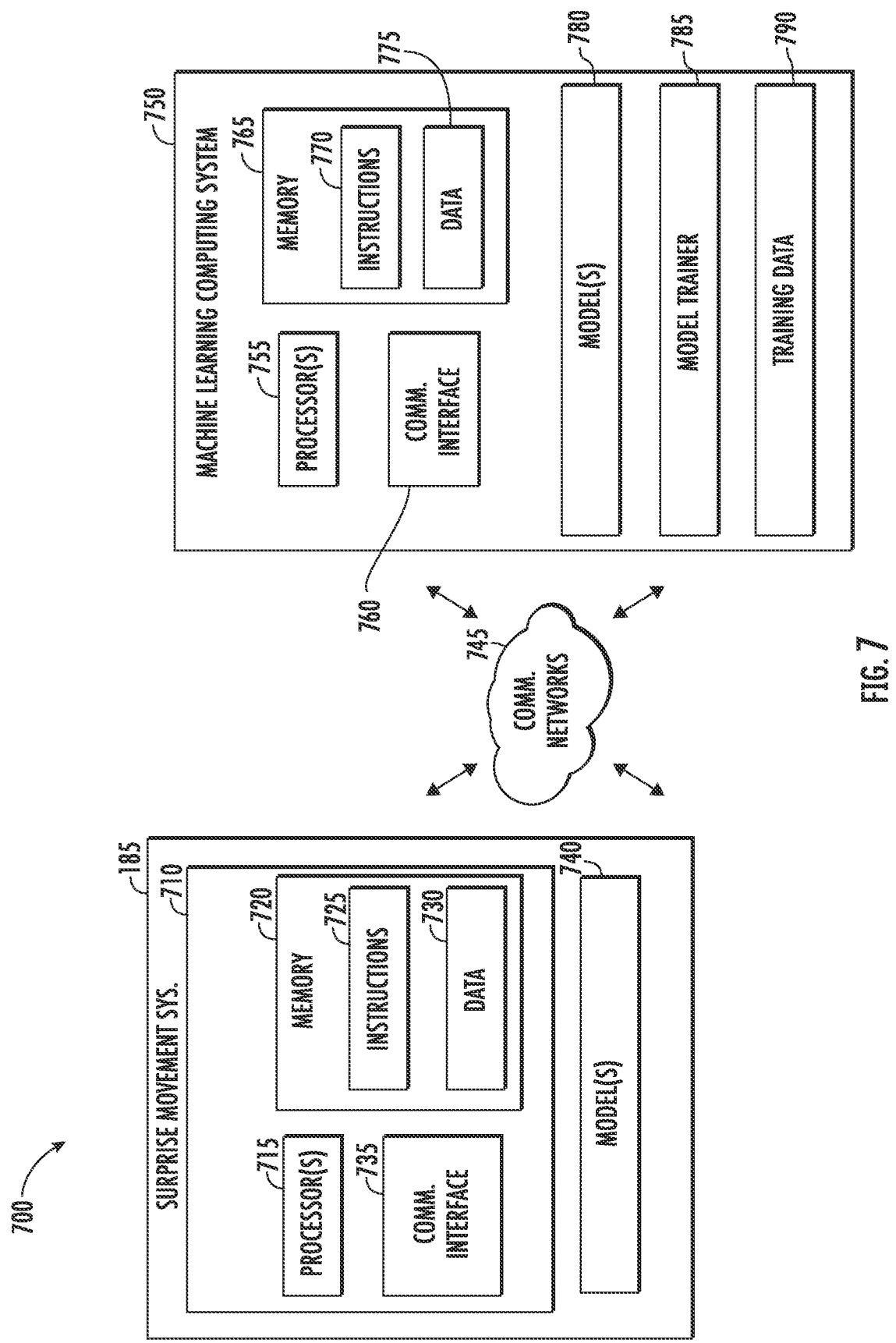
FIG. 7 depicts a block diagram of an example computing system according to example implementations of the present disclosure.

The method 600 can include determining, at 610, failsafe region data representing an unexpected path or an unexpected area where a likelihood of the actor following the unexpected path or entering the unexpected area is below a threshold, for example as described above with reference to FIGS. 2-3B and 5A-5C. A surprise movement unit, for example as described below with reference to FIG. 7, is one example of a means for determining the failsafe region data based on the motion forecast data.

For a second compute cycle 612, the method 600 can include obtaining, at 615, second sensor data. The method 600 can include, at 615, determining, based on the second sensor data and the failsafe region data, that the actor has followed the unexpected path or entered the unexpected area, for example as described above with reference to FIGS. 2-3B and 5A-5C. The surprise movement unit, for example as described below with reference to FIG. 7, is one example of a means for determining the failsafe region data based on the motion forecast data.

The method 600 can include, at 625, in response to determining that the actor has followed the unexpected path or entered the unexpected area, determining a deviation for controlling a movement of the autonomous vehicle, for example as described above with reference to FIGS. 2-3B and 5A-5C. The surprise movement unit, for example as described below with reference to FIG. 7, is one example of a means for determining the deviation for controlling the movement of the autonomous vehicle.

Example aspects of the present disclosure can provide a number of technical effects and benefits, including improvements to computing systems. For example, aspects of the present disclosure can reduce computational resources and/or reduce latency needed to control movement of the autonomous vehicle. As described herein, unexpected movements can be detected with reduced latency. More particularly, the computing system can determine, for a first compute cycle based on motion forecast data, failsafe region data representing an unexpected path or an unexpected area where a likelihood of the actor following the unexpected path or entering the unexpected area is below a threshold. Next, for the second compute cycle, the computing system can obtain second sensor data and determine, based on the second sensor data and the failsafe region data, that the actor has followed the unexpected path or entered the unexpected area. In response to determining that the actor has followed the unexpected path or entered the unexpected area, determining a primary deviation (e.g., the deviation(s) 324, 406 described above) for controlling a movement of the autonomous vehicle. Identifying the unexpected path(s) and/or unexpected area(s) in the first compute cycle, can improve the speed of detection and response in the second compute cycle when the unexpected behavior is actually detected. Furthermore, in some implementations, the computing system can determine a motion plan and/or implement a preliminary deviation (such as braking or changing directions) before the unexpected behavior is actually detected in the second compute cycle. Thus, the reaction time of the autonomous vehicle can be improved thereby improving safety.

Further, as another example of technical effects and benefits, aspects of the disclosure are directed to detecting when the computing system is forecasting paths or trajectories for actors that are not sufficiently accurate. In such embodiments, the computing system can employ an alternative trajectory projecting method, such as a simple ballistic method, quadratic regression method, and/or other fallback predicted trajectories. Such alternative methods can be employed as a failsafe measure when unexpected behavior is detected for an actor or likely for an actor. Thus, the present disclosure can improve safety by detecting and addressing poorly forecasted paths for actors.

FIG. 7 depicts example system components of an example system 700 according to example implementations of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include a surprise movement system 185 and a machine learning computing system 750 that are communicatively coupled over one or more network(s) 745. As described herein, the surprise movement system 185 can be implemented onboard a vehicle (e.g., as a portion of the vehicle computing system 100) and/or can be remote from a vehicle (e.g., as a portion of an operations computing system 195). In either case, a vehicle computing system 100 can utilize the operations and model(s) of the surprise movement system 185 (e.g., locally, via wireless network communication, etc.).

The surprise movement system 185 can include one or computing device(s) 710. The computing device(s) 710 of the surprise movement system can include processor(s) 715 and a memory 720. The one or more processor(s) 715 can be any suitable processing device (e.g., a processor core, a microprocessor, an ASIC, a FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, etc., and/or combinations thereof.

The memory 720 can store information that can be obtained by the one or more processor(s) 715. For instance, the memory 720 (e.g., one or more non-transitory computer-readable storage mediums, memory devices, etc.) can include computer-readable instructions 725 that can be executed by the one or more processors 715. The instructions 725 can be software written in any suitable programming language or can be implemented in hardware. Additionally, or alternatively, the instructions 725 can be executed in logically and/or virtually separate threads on processor(s) 715.

For example, the memory 720 can store instructions 725 that when executed by the one or more processors 715 cause the one or more processors 715 (e.g., of the surprise movement system 185) to perform operations such as any of the operations and functions of the surprise movement system 185 and/or for which the surprise movement system 185 is configured, as described herein (e.g., with reference to FIGS. 2-6). Example operations including determining failsafe region data, determining that the actor has followed the unexpected path or entered the unexpected area and/or training one or machine-learned models determine the failsafe region data or that the actor has followed the unexpected path or entered the unexpected area. the operations and functions of any of the models described herein, and/or for which the models are configured and/or any other operations and functions for the surprise movement system 185, as described herein.

The memory 720 can store data 730 that can be obtained (e.g., received, accessed, written, manipulated, generated, created, stored, etc.). The data 730 can include, for instance, sensor data, object detection data, failsafe region data, data indicative of a deviation (e.g., preliminary deviation and/or primary deviation), data indicative of one or more machine-learned model(s), such as object detection model(s), 3D localization model(s), maturing/speeding model(s), prediction system model(s), planning model(s), plan validation model(s), and/or vehicle control model(s), and/or other data/information described herein. In some implementations, the computing device(s) 710 can obtain data from one or more memories that are remote from the surprise movement system 185.

The computing device(s) 710 can also include a communication interface 735 used to communicate with one or more other system(s) (e.g., other systems onboard and/or remote from a vehicle, the other systems of FIG. 1, etc.). The communication interface 735 can include any circuits, components, software, etc. for communicating via one or more networks (e.g., 745). In some implementations, the communication interface 735 can include, for example, one or more of a communications controller, receiver, transceiver, transmitter, port, conductors, software and/or hardware for communicating data/information.

According to an aspect of the present disclosure, the surprise movement system 185 can store or include one or more machine-learned models 740. As examples, the machine-learned model(s) 740 can be or can otherwise include the object detection model(s), 3D localization model(s), maturing/speeding model(s), prediction system model(s), planning model(s), plan validation model(s), and/or vehicle control model(s), and/or other data/information described herein. The machine-learned model(s) 740 can be or include neural networks (e.g., deep neural networks), support vector machines, decision trees, ensemble models, k-nearest neighbors models, Bayesian networks, or other types of models including linear models and/or non-linear models. Example neural networks include recurrent neural networks (e.g., long short-term memory recurrent neural networks, etc.), feed-forward neural networks (e.g., convolutional neural networks, etc.), and/or other forms of neural networks.

In some implementations, the surprise movement system 185 can receive the one or more machine-learned models 740, from the machine learning computing system 750 over the network(s) 745 and can store the one or more machine-learned models 740 in the memory 720 of the surprise movement system 185. The surprise movement system 185 can use or otherwise implement the one or more machine-learned models 740 (e.g., by processor(s) 615). For example, the surprise movement system 185 can implement the machine learned model(s) 740 to determine failsafe region data representing an unexpected path or an unexpected area where a likelihood of the actor following the unexpected path or entering the unexpected area is below a threshold.

The machine learning computing system 750 can include one or more processors 755 and a memory 765. The one or more processors 755 can be any suitable processing device (e.g., a processor core, a microprocessor, an ASIC, a FPGA, a controller, a microcontroller, etc.) and can be one processor or a plurality of processors that are operatively connected. The memory 765 can include one or more non-transitory computer-readable storage media, such as RAM, ROM, EEPROM, EPROM, one or more memory devices, flash memory devices, etc., and/or combinations thereof.

The memory 765 can store information that can be accessed by the one or more processors 755. For instance, the memory 765 (e.g., one or more non-transitory computer-readable storage mediums, memory devices, etc.) can store data 775 that can be obtained (e.g., generated, retrieved, received, accessed, written, manipulated, created, stored, etc.). In some implementations, the machine learning computing system 750 can obtain data from one or more memories that are remote from the machine learning computing system 750.

The memory 765 can also store computer-readable instructions 770 that can be executed by the one or more processors 755. The instructions 770 can be software written in any suitable programming language or can be implemented in hardware. Additionally, or alternatively, the instructions 770 can be executed in logically and/or virtually separate threads on processor(s) 755. The memory 765 can store the instructions 770 that when executed by the one or more processors 755 cause the one or more processors 755 to perform operations. The machine learning computing system 750 can include a communication interface 760, including devices and/or functions similar to that described with respect to the surprise movement system 185.

In some implementations, the machine learning computing system 750 can include one or more server computing devices. If the machine learning computing system 750 includes multiple server computing devices, such server computing devices can operate according to various computing architectures, including, for example, sequential computing architectures, parallel computing architectures, or some combination thereof.

In addition, or alternatively to the model(s) 740 at the surprise movement system 185, the machine learning computing system 750 can include one or more machine-learned model(s) 680. As examples, the machine-learned model(s) 780 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 780 can be similar to and/or the same as the machine-learned models 740, and/or any of the models discussed herein with reference to FIGS. 1 through 6.

As an example, the machine learning computing system 750 can communicate with the surprise movement system 185 according to a client-server relationship. For example, the machine learning computing system 750 can implement the machine-learned models 780 to provide a web service to the surprise movement system 185 (e.g., including on a vehicle, implemented as a system remote from the vehicle, etc.). For example, the web service can provide machine-learned models to an entity associated with a vehicle; such that the entity can implement the machine-learned model(s) (e.g., to forecast actor motion, etc.). Thus, machine-learned models 780 can be located and used at the surprise movement system 185 (e.g., on the vehicle 105, at the operations computing system 195, etc.) and/or the machine-learned models 780 can be located and used at the machine learning computing system 750.

In some implementations, the machine learning computing system 750 and/or the surprise movement system 185 can train the machine-learned model(s) 740 and/or 780 through the use of a model trainer 785. The model trainer 785 can train the machine-learned models 740 and/or 780 using one or more training or learning algorithm(s). The model trainer 785 can perform backwards propagation of errors, supervised training techniques using a set of labeled training data, and/or unsupervised training techniques using a set of unlabeled training data. The model trainer 785 can perform a number of generalization techniques to improve the generalization capability of the models being trained. Generalization techniques include weight decays, dropouts, or other techniques.

The model trainer 780 can train a machine-learned model (e.g., 740 and/or 780) based on a set of training data 790. The training data 790 can include, for example, labeled datasets and/or unlabeled datasets.

In some implementations, the training data 790 can be taken from the same vehicle as that which utilizes the model(s) 740 and/or 780. Accordingly, the model(s) 740 and/or 780 can be trained to determine outputs in a manner that is tailored to that particular vehicle. Additionally, or alternatively, the training data 790 can be taken from one or more different vehicles than that which is utilizing the model(s) 740 and/or 780. The model trainer 785 can be implemented in hardware, firmware, and/or software controlling one or more processors. Additionally, or alternatively, other data sets can be used to train the model(s) (e.g., models 740 and/or 780) including, for example, publicly accessible datasets (e.g., labeled data sets, unlabeled data sets, etc.).

The network(s) 745 can be any type of network or combination of networks that allows for communication between devices. In some embodiments, the network(s) 745 can include one or more of a local area network, wide area network, the Internet, secure network, cellular network, mesh network, peer-to-peer communication link and/or some combination thereof and can include any number of wired or wireless links. Communication over the network(s) 745 can be accomplished, for instance, via a network interface using any type of protocol, protection scheme, encoding, format, packaging, etc.

FIG. 7 illustrates one example system 700 that can be used to implement the present disclosure. Other computing systems can be used as well. For example, in some implementations, the surprise movement system 185 can include the model trainer 785 and the training dataset 790. In such implementations, the machine-learned models 740 can be both trained and used locally at the surprise movement system 185 (e.g., at the vehicle 105).

Computing tasks discussed herein as being performed at computing device(s) remote from the vehicle 105 can instead be performed at the vehicle 105 (e.g., via the vehicle computing system 100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 8:
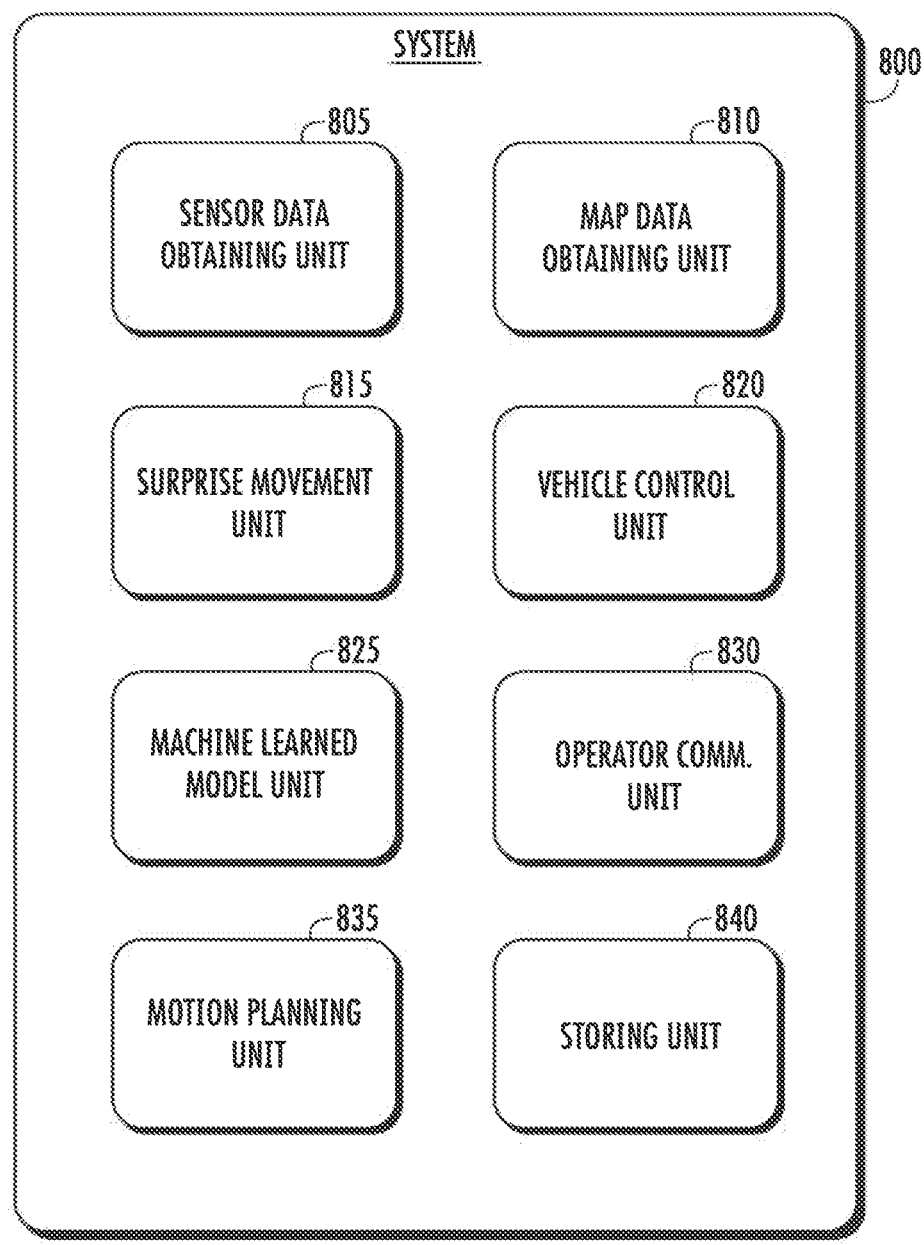
FIG. 8 depicts a block diagram of an example computing system according to example implementations of the present disclosure.

FIG. 8 depicts example system components of an example system according to example implementations of the present disclosure. Various means can be configured to perform the methods and processes described herein. For example, a computing system can include sensor data obtaining unit(s) 805, map data obtaining unit(s) 810, surprise movement unit(s) 815, vehicle controlling unit(s) 820, machine learned model unit(s) 825, operator communication unit(s) 830, motion planning unit(s) 835, data storing unit(s) 840, and/or other means. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the one or more actors near the autonomous vehicle, autonomous vehicle's surrounding environment, and the position and movement of the autonomous vehicle. In some implementations, the means can be configured to obtain spatial data points. One example includes obtaining LIDAR data, (e.g., a three-dimensional point cloud) from a LIDAR system and/or control aspects of the LIDAR system's operation, such as scan rate, LIDAR point density in unexpected areas and/or paths, and the like. In some implementations, the means can be configured to obtain image data obtained from one or more cameras. In some implementations, the means can be configured to obtain a birds-eye view representation of data obtained relative to the autonomous vehicle. The sensor data obtaining unit 805 is one example of a means for obtaining the first sensor data collected during the first compute cycle and the second sensor data collected during the second compute cycle, as described herein.

The means can be configured to provide inputs to one or more machine-learned models, such as object detection model, 3D localization models, tracking and/or fusion models, maturing models, prediction models, planning models, plan validation models, and control models. The machine learned model unit 825 is one example of a means for providing various inputs to the machine learned models and receiving multiple outputs therefrom.

More particularly, in some embodiments, the means can be configured to obtain motion forecast data based on first sensor data collected during the first compute cycle and with respect to an actor relative to an autonomous vehicle. The sensor data obtaining unit 805 is one example of a means for collecting first sensor data during the first compute cycle. The motion planning unit is one example of a means for obtaining the motion forecast data based on the first sensor data.

The means can be configured to determine, based on the motion forecast data, failsafe region data representing an unexpected path or an unexpected area where a likelihood of the actor following the unexpected path or entering the unexpected area is below a threshold. The surprise movement unit 815 is one example of a means for determining the failsafe region data based on the motion forecast data.

The means can be configured to determine, based on the second sensor data and the failsafe region data, that the actor has followed the unexpected path or entered the unexpected area. For example, the means can identify LIDAR points or image pixels in the unexpected area or along the unexpected path that indicate that the actor has followed the unexpected path or entered the unexpected area. The sensor data obtaining unit is one example of a means for collecting second sensor data during the second compute cycle. The surprise movement unit 815 is one example of a means for determining that the actor has followed the unexpected path or entered the unexpected area based on the second sensor data.

The means can be configured to determine a deviation for controlling a movement of the autonomous vehicle in response to determining that the actor has followed the unexpected path or entered the unexpected area. For example, the means can determine a deviation that includes applying the brake or steering the autonomous vehicle (e.g., to change lanes). The surprise movement unit is one example of a means for determining the deviation for controlling the movement of the autonomous vehicle in response to determining that the actor has followed the unexpected path or entered the unexpected area. The motion planning unit 835 is another example of a means for determining the deviation for controlling the movement of the autonomous vehicle in response to determining that the actor has followed the unexpected path or entered the unexpected area.

The means can be configured to control one or more vehicle controls (e.g., actuators or other devices that control gas flow, steering, braking, etc.) to execute the deviation for controlling the movement of the autonomous vehicle. A vehicle controlling unit 820 is one example of a means for controlling motion of the autonomous vehicle to execute the motion plan.

In some embodiments, the means can be configured to access or otherwise obtain map data associated with a surrounding geographic environment of the autonomous vehicle. The map data can be used locate unexpected areas and/or determine unexpected paths for actors. As examples, the map data can include locations of crosswalks, blind driveways, and other features that can be considered when identifying unexpected areas and/or unexpected paths. More particularly, in some implementations, the means can be configured to access or otherwise obtain map data that provides information regarding: the identity and location of different roadways, road segments, buildings, or other items or objects (e.g., lampposts, crosswalks, and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the computing system in processing, analyzing, and perceiving likely locations and/or paths of nearby actors, the surrounding environment, and the autonomous vehicle's relationship thereto. In some implementations, the means can be configured to access or otherwise obtain map data that is provided in a birds-eye view representation, such as generated by rasterization or other suitable processing format. The map data obtaining unit 810 is one example of a means for obtaining such map data as described herein.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system for controlling an autonomous vehicle, the autonomous vehicle control system comprising:
   one or more processors; and
   one or more non-transitory computer-readable media storing instructions that are executable to cause the one or more processors to perform operations, the operations comprising:
      obtaining sensor data descriptive of an actor in an environment of an autonomous vehicle;
      determining, based on the sensor data, a plurality of foreseeable paths for the actor;
      determining, in a first compute cycle, and based on the plurality of foreseeable paths, a preliminary action for controlling a movement of the autonomous vehicle, the preliminary action configured for execution as a precaution to improve a reaction of the autonomous vehicle to the actor traveling on one of the plurality of foreseeable paths; and
      initiating control of the movement of the autonomous vehicle according to the preliminary action by executing the preliminary action at least until a second compute cycle.

2. The autonomous vehicle control system of claim 1, wherein the operations comprise:
   stopping execution of the preliminary action based on a determination that the actor did not travel on the one of the plurality of foreseeable paths.

3. The autonomous vehicle control system of claim 1, wherein the preliminary action diverges from a motion plan generated based on a determination that the actor will not travel on the one of the plurality of foreseeable paths.

4. The autonomous vehicle control system of claim 1, wherein the preliminary action comprises a braking action.

5. The autonomous vehicle control system of claim 1, wherein initiating control of the movement of the autonomous vehicle comprises:
   controlling one or more actuators of the autonomous vehicle based on the preliminary action.

6. The autonomous vehicle control system of claim 1, wherein the first compute cycle corresponds to processing a first LIDAR sweep and the second compute cycle corresponds to processing a subsequent LIDAR sweep.

7. The autonomous vehicle control system of claim 1, wherein the operations comprise:
   determining a first motion plan and a second motion plan, wherein the second motion plan corresponds to the reaction; and
   executing the first motion plan after execution of the preliminary action.

8. The autonomous vehicle control system of claim 1, wherein the operations comprise:
   determining a first motion plan and a second motion plan, wherein the second motion plan corresponds to the reaction; and
   executing the second motion plan after execution of the preliminary action and responsive to the actor traveling on one of the plurality of foreseeable paths.

9. One or more non-transitory computer-readable media storing instructions that are executable to cause one or more processors to perform operations for controlling an autonomous vehicle, the operations comprising:
   obtaining sensor data descriptive of an actor in an environment of an autonomous vehicle;
   determining, based on the sensor data, a plurality of foreseeable paths for the actor;
   determining, in first compute cycle, and based on the plurality of foreseeable paths, a preliminary action for controlling a movement of the autonomous vehicle, the preliminary action configured for execution as a precaution to improve a reaction of the autonomous vehicle to the actor traveling on one of the plurality of foreseeable paths; and
   initiating control of the movement of the autonomous vehicle according to the preliminary action by executing the preliminary action at least until a second compute cycle.

10. The one or more non-transitory computer-readable media of claim 9, wherein the operations comprise:
    stopping execution of the preliminary action based on a determination that the actor did not travel on the one of the plurality of foreseeable paths.

11. The one or more non-transitory computer-readable media of claim 9, wherein the preliminary action diverges from a motion plan determined under an assumption that the actor will not travel on one of the plurality of foreseeable paths.

12. The one or more non-transitory computer-readable media of claim 9, wherein the preliminary action comprises a braking action.

13. The one or more non-transitory computer-readable media of claim 9, wherein initiating control of the movement of the autonomous vehicle comprises:
    controlling one or more actuators of the autonomous vehicle based on the preliminary action.

14. The one or more non-transitory computer-readable media of claim 9, wherein the first compute cycle corresponds to processing a first LIDAR sweep and the second compute cycle corresponds to processing a subsequent LIDAR sweep.

15. The one or more non-transitory computer-readable media of claim 9, wherein the operations comprise:
    determining a first motion plan and a second motion plan, wherein the second motion plan corresponds to the reaction; and
    executing the first motion plan after execution of the preliminary action.

16. The one or more non-transitory computer-readable media of claim 9, wherein the operations comprise:
    determining a first motion plan and a second motion plan, wherein the second motion plan corresponds to the reaction; and
    executing the second motion plan responsive to the actor traveling on one of the plurality of foreseeable paths and after execution of the preliminary action.

17. A method for controlling an autonomous vehicle, the method comprising:
    obtaining sensor data descriptive of an actor in an environment of an autonomous vehicle;
    determining, based on the sensor data, a plurality of foreseeable paths for the actor;
    determining, in first compute cycle, and based on the plurality of foreseeable paths, a preliminary action for controlling a movement of the autonomous vehicle, the preliminary action configured for execution as a precaution to improve a reaction of the autonomous vehicle to the actor traveling on one of the plurality of foreseeable paths; and
    initiating control of the movement of the autonomous vehicle according to the preliminary action by executing the preliminary action at least until a second compute cycle.

18. The method of claim 17, comprising:
    stopping execution of the preliminary action based on a determination that the actor did not travel on the one of the plurality of foreseeable paths.

19. The method of claim 17, comprising:
    determining a first motion plan and a second motion plan, wherein the second motion plan corresponds to the reaction; and
    executing the second motion plan responsive to the actor traveling on one of the plurality of foreseeable paths and after execution of the preliminary action.

20. The method of claim 17, wherein the first compute cycle corresponds to processing a first LIDAR sweep and the second compute cycle corresponds to processing a subsequent LIDAR sweep.

* * * * *